United States Patent [19]

Ogura et al.

[11] Patent Number: 5,526,141
[45] Date of Patent: Jun. 11, 1996

[54] ORIGINAL IMAGE READING APPARATUS HAVING DEVICE FOR CONVEYING AN ORIGINAL AT A POSITION DEVIATED FROM AN ORIGINAL READING POSITION OF A CONTACT-TYPE READING SENSOR

[75] Inventors: Makoto Ogura, Isehara; Hiroo Ichihashi, Chigasaki; Katsumi Komiyama, Isehara; Yoshikazu Sano, Kawasaki; Osamu Hamamoto, Isehara; Tetsuya Shimada, Zama, all of Japan

[73] Assignee: Canon Kabushiki Kaisha, Tokyo, Japan

[21] Appl. No.: 203,592

[22] Filed: Feb. 28, 1994

Related U.S. Application Data

[63] Continuation of Ser. No. 872,771, Apr. 23, 1992, abandoned.

[30] Foreign Application Priority Data

Apr. 26, 1991 [JP] Japan ................... 3-123051

[51] Int. Cl.$^6$ .................................................. H04N 1/04
[52] U.S. Cl. ..................... 358/496; 358/498; 358/7
[58] Field of Search ................... 355/233, 230, 355/75, 99; 358/494, 496, 498

[56] References Cited

U.S. PATENT DOCUMENTS

| | | | |
|---|---|---|---|
| 4,317,138 | 2/1982 | Bryan et al. | 358/291 |
| 4,496,984 | 1/1985 | Stoffel | 358/293 |
| 4,583,126 | 4/1986 | Stoffel | 358/294 |
| 4,754,337 | 6/1988 | Nohtomi et al. | 358/498 X |
| 4,812,917 | 3/1989 | Suzuki | 358/494 X |
| 4,866,291 | 9/1989 | Shimada et al. | 250/578 |
| 4,895,288 | 1/1990 | Kotani et al. | 358/498 X |
| 4,920,431 | 4/1990 | Ogura et al. | 358/496 |
| 4,953,037 | 8/1990 | Ito et al. | 358/496 |
| 4,970,606 | 11/1990 | Shima | 358/498 X |
| 4,975,787 | 12/1990 | Ijuin et al. | 358/498 X |
| 4,996,606 | 2/1991 | Kawai et al. | 358/475 |
| 5,070,415 | 12/1991 | Matsumoto | 358/496 X |
| 5,072,307 | 12/1991 | Shirakoshi et al. | 358/496 X |
| 5,077,614 | 12/1991 | Stemmle et al. | 358/498 X |
| 5,101,285 | 3/1992 | Kawai et al. | 358/471 |
| 5,168,310 | 12/1992 | Hayashi et al. | 355/233 |
| 5,225,917 | 7/1993 | Osako | 358/498 |

FOREIGN PATENT DOCUMENTS

| | | |
|---|---|---|
| 0280242 | 8/1988 | European Pat. Off. . |
| 0297566 | 1/1989 | European Pat. Off. . |
| 0391632 | 10/1990 | European Pat. Off. . |
| 0434285 | 6/1991 | European Pat. Off. . |
| 2536551 | 5/1984 | France . |
| 0046361 | 4/1981 | Japan ................... 358/498 |
| 0024269 | 2/1983 | Japan ................... 358/498 |
| 1194656 | 8/1989 | Japan . |
| 2169467 | 7/1986 | United Kingdom . |

OTHER PUBLICATIONS

Hirochika Kataoka, et al., Standard Type Digital Facsimile, Review of the Electrical Communication Laboratories, vol. 33, No. 2, Mar. 1985.

*Primary Examiner*—Robert Beatty
*Attorney, Agent, or Firm*—Fitzpatrick, Cella, Harper & Scinto

[57] ABSTRACT

An original image reading device includes a first supporting device having an original platen roller, provided on a side of an original opposed to an image reading device, for conveying the original at a position deviated from an original reading position, and a non-cylindrical original contact device for urging the original toward the image reading device. The original contact device is provided at the original reading position on the side of the original opposed to the image reading device. A second supporting device includes the image reading device, which has a contact-type reading sensor. The image reading device reads image information of the original by receiving a light reflected from the original. The first supporting device and the second supporting device are combined at a fulcrum at an original exit side so as to relatively rotatable. The original platen roller is separated from the second supporting device upon relative rotation of the first and second supporting devices.

54 Claims, 27 Drawing Sheets

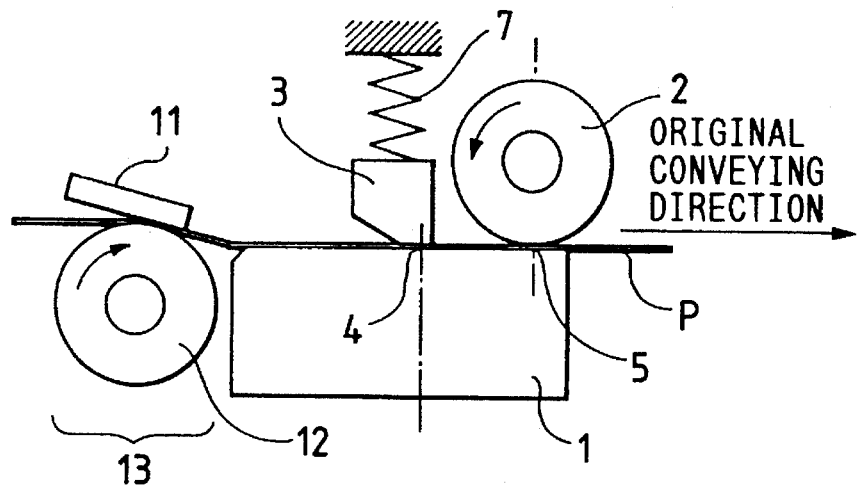
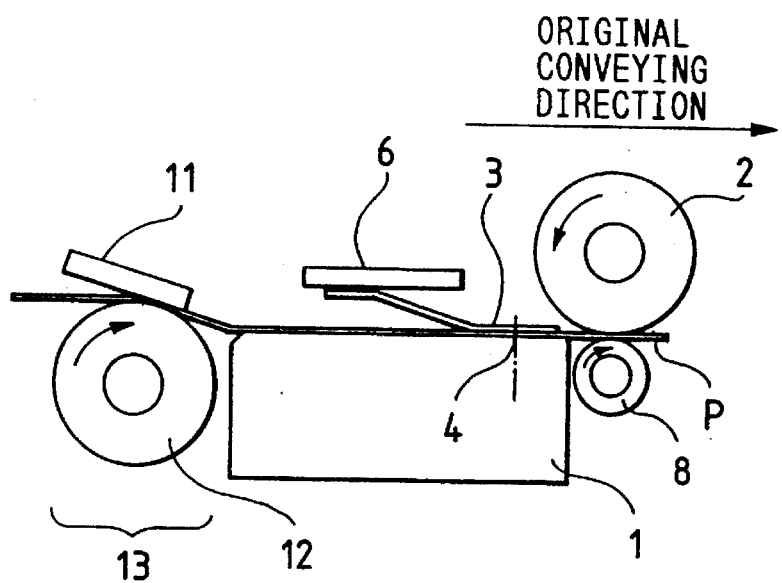
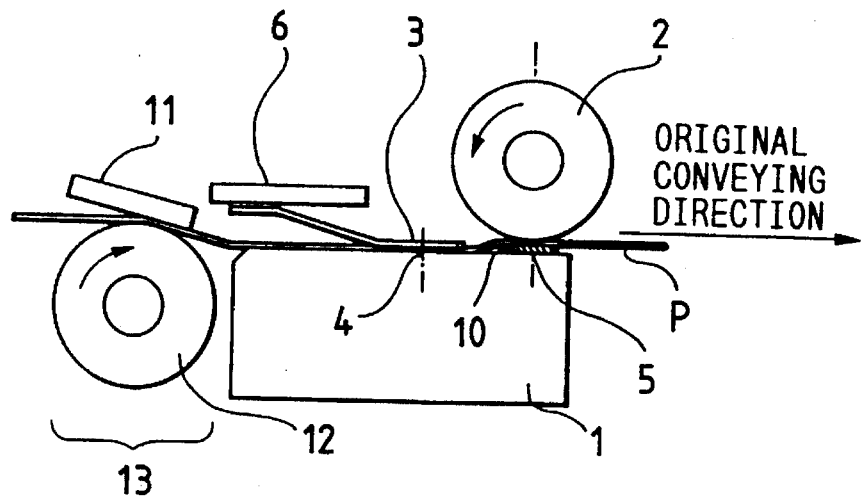

ORIGINAL IMAGE READING APPARATUS HAVING DEVICE FOR CONVEYING AN ORIGINAL AT A POSITION DEVIATED FROM AN ORIGINAL READING POSITION OF A CONTACT-TYPE READING SENSOR

This application is a continuation of application Ser. No. 07/872,771 filed Apr. 23, 1992, which is now abandoned.

BACKGROUND OF THE INVENTION

1. Field of the Invention

The present invention relates to an original image reading device and an image processing apparatus, and more particularly to an original image reading device and an image processing apparatus having said device for optically reading image information of an original document and detachably mounted on an image information processing apparatus such as a facsimile apparatus, an image scanner or the like.

2. Related Background Art

Requirements for smaller dimension, lower weight and lower cost have become stronger in recent years in the field of image information processing apparatus, such as facsimile apparatus, image scanner or the like. For the facsimile apparatus in particular, there have emerged various requirements for the design and functions, in addition to the above-mentioned ones, following the expansion of market including so-called home facsimile for personal use.

For the original image reading device to be incorporated in such image information processing apparatus for optically reading the image information of the original document, there have been employed a reduction reading system utilizing a line sensor such as a CCD and a reduction optical system; a contact reading system utilizing a line sensor of a length equal to the width of the original, an equal-magnification optical system such as a condensing fiber lens array and a light source such as an LED array, all integrally assembled in a frame; and a complete contact reading system utilizing a line sensor and a light source integrally assembled in a frame, without the lens array, wherein the line sensor is maintained close to the original for directly reading the original image.

An example of such original image reading device is schematically illustrated in FIGS. 1 and 2 which are respectively a cross-sectional view and a schematic perspective view for the original image reading device.

1 is a line sensor as image reading means for optically reading the image of an original P. 13 is an automatic sheet feeding unit consisting of a separating member 11 and a sheet supplying roller 12, for separating and feeding the originals P one by one toward said line sensor 1, even if a plurality of originals are provided, by pressing the separating member 11 toward the sheet supplying roller 12 side with an appropriate force. 2 is a transport (pressure) roller as transporting means having the features of original transporting means for transporting the original P as well as original contacting means for pressing and contacting the fed original P to a reading position 4 of the line sensor 1.

However, as the functions of original transport means and original contacting means are performed by a transport roller in the original image reading device, as shown in FIG. 1, the following drawbacks may result, according to a view of the inventors.

(1) In order to maintain the original in close contact with the line sensor for reading the original image by said line sensor, the transport roller has to be as long as the line sensor or the reading width of the original. Therefore the local unevenness in the transporting power results from the planarity of the reading face of the line sensor, eventually causing skewed advancement of the original.

(2) The transportation of the original in contact with the reading face of the line sensor increases the load on a motor for driving the transport roller, thus eventually leading to heat generation or control abnormality in said motor. Therefore, for achieving stable transportation of the original, there is required a large motor, which becomes an obstacle in compactization and weight reduction of the device.

(3) An original eventually fed in skewed state tends to become more skewed in the course of transportation, as will be explained in the following with reference to FIG. 3.

FIG. 3 is a schematic plan view from above the image reading device shown in FIGS. 1 and 2, wherein the line sensor is not illuminated but is positioned behind the transport roller 2.

When an original P is fed in a skewed state in the automatic sheet feeding unit 13 as shown in FIG. 3A, it is advanced to the transport roller 2, as shown in FIG. 3B, by the transporting force (a) indicated by an arrow. Then, as a part of the original P is pinched between the transport roller 2 and the line sensor as shown in FIG. 3C, said part is subjected to a transportion force (b) of the transport roller 102, indicated by an arrow. In general, the peripheral speed of the feed roller (not shown in the Figure) of the automatic sheet feeding unit 13 is selected somewhat smaller than that of the transport roller 2. Consequently a load (c) indicated by an arrow is generated in a direction opposite to the transport direction of the original, due to a difference in peripheral speed and a load induced by the frictional member, and a rotating force (d), also indicated by an arrow, is generated by the aforementioned transporting force (b) and the load (c), thus causing an increased skew in the original P.

For a demand for a smaller, lighter and less expensive image reading device which is increasingly sought in recent years, as above described, it is said that a construction as shown in FIG. 1 is insufficient, and there are left many technical problems to be solved. These points especially brought about some problems in handling a lensless complete contact type image sensor which can be most compactly fabricated.

And there are still left technical problems for sufficiently meeting the requirements of realizing the demand for a smaller, lighter and less expensive image reading device in recent years.

However, in order to meet requirements for a compact, lightweight, and inexpensive structure, and diversified designs and functions of the image information processing apparatus, the following technical subjects remain unsolved in the conventional image reading device and the image information processing apparatus.

(1) As the apparatus is rendered compact and lightweight, it is difficult to assure assembling position precision. As a result, parts precision must be further improved, thus preventing the manufacture of an inexpensive apparatus.

(1-1) In the conventional image information processing apparatus, since various components are integrally locked on the main body frame, the main body frame assures rigidity of the image information processing apparatus. Therefore, as the apparatus is rendered compact and lightweight, the rigidity of the main body frame is decreased, thus impairing assembling position precision of the respective components. In particular, a decrease in rigidity of the main body frame impairs positional precision between the original image reading device and the platen roller, thus degrading image reading performance, and original convey performance.

(1-2) In order to realize a compact, lightweight apparatus, for example, the dimensions of a gear module are decreased to decrease the gear diameter. In this case, precision of the distance between the centers of gears must be further improved. As a result, it is difficult to reduce parts cost.

(2) Loads upon changes in design and function are considerable, and prevent the manufacture of an inexpensive apparatus.

(2-1) In the conventional image information processing apparatus, since various components are integrally locked on the main body frame, the shape of the main body frame determines the design of the product. Therefore, when the design is changed, the shape of the main body frame must be changed first, and the design load, cost of, e.g., molds, and cost upon a change in production equipment prevent the manufacture of an inexpensive image information processing apparatus.

(2-2) When the functions of the image information processing apparatus are changed, various loads prevent the manufacture of an inexpensive image information processing apparatus like in the change in design.

(3) Replacement and repair are not easy when a defect or malfunction is found.

(3-1) In consideration of the production process of the image information processing apparatus, after components mounting the original image reading device are assembled on the main body frame of the image information processing apparatus, the function check test of the image information apparatus is conducted. As a result of the test, for example, a defect is found in the original image reading device. Other assembled components must be disassembled from the main body frame, and the original image reading device must be replaced or repaired. Furthermore, the original image reading device must be assembled on the main body frame again, and then, adjustment must be performed.

(3-2) For example, when the original image reading device malfunctions during use of the image information processing apparatus, the original image reading device must be disassembled from the main body frame of the image information processing apparatus together with other components, and must be replaced or repaired. Furthermore, the original image reading device must be assembled on the main body frame again, and then, adjustment must be performed.

In particular, in the contact reading system, since the focal depth is relatively shallow, an original and the reading surface must be precisely aligned. In this case, when the platen roller 2 and the reading device 1 are independently locked on the main body frame 106 of the apparatus like in the conventional apparatus, it is difficult to align the roller 2 with the reading surface of the reading device 1, thus undesirably prolonging an assembling time of the overall apparatus.

SUMMARY OF THE INVENTION

In consideration of the foregoing, an object of the present invention is to provide a compact, lightweight and inexpensive image reading device, adapted for use in various image information processing apparatuses such as a facsimile apparatus, an image sensor, a computer, a word processor, a copying machine or the like.

Another object of the present invention is to provide an image reading device capable of reducing the total height of the device, not requiring a high precison of assembling for guiding the reflected light to the reading part, and enabling the easy selection of a material for the pressurizing means.

Also, another object of the present invention is to provide an image reading device having original pressing means, in which the total height of the device is reduced, a high assembling precision is not required for leading the reflected light to a reading portion, and the selection of a material for said pressing means is easy.

A further object of the present invention is to provide an original image reading device capable of reading the original image with a simple construction without transporting the original in an erroneous oblique direction.

A further object of the present invention is to provide an easily handled original image reading device even if it includes a contact type image sensor of which positioning and original transporting would be difficult.

A further object of the present invention is to provide an original image reading device removably and easily combined together with an information processing apparatus.

Still another object of the present invention is to provide an image reading device capable of resolving skewed advancement, elevated cost and increased dimension for example of motor, and enabling to achieve reductions in dimension, weight and cost desired in recent years.

Still another object of the present invention is to provide an image reading device, capable of improving the precision of assembly of components relating to original reading, by integrally positioning a frame and employing unit structure.

Still another object of the present invention is to provide an image reading device capable of significantly reducing the work involved in designing, evaluation and production by standardizing said unit so as to be adaptable for various models of the image information processing apparatus, thereby enabling total cost reduction thereof.

Still another object of the present invention is to provide an image reading device formed as a compact and lightweight unit, thereby facilitating the layout in the image information processing apparatus and increasing the freedom in design thereof.

Still another object of the present invention is to provide an image reading device which is easily replaceable by the operator without particular training, skill or tool, whereby the defect or malfunction of the image reading device in the image information processing apparatus can be easily repaired.

BRIEF DESCRIPTION OF THE DRAWINGS

FIG. 7 is a schematic cross-sectional view for explaining an original image reading device according to a second embodiment of the present invention.

FIG. 8 is a schematic cross-sectional view for explaining an original image reading device according to a third embodiment of the present invention.

FIG. 9 is a schematic cross-sectional view for explaining an original image reading device according to a fourth embodiment of the present invention.

DETAILED DESCRIPTION OF THE PREFERRED EMBODIMENTS

The above-mentioned objects can be attained by an original image reading device and an information processing apparatus having said device, comprising a first frame having an image reading means for reading the image information of an original by receiving the light reflected from the original, and a second frame having an original platen roller for conveying the original which is provided on the opposite side of said image reading means, with the original carried therebetween, and an original contact means for urging the original toward said image reading means side, wherein said first frame and said second frame have a fulcrum on the original exit side around which they are rotatable relatively.

The embodiments of the present invention will be described below with reference to the drawings.

The preferred embodiments of the present invention are constituted as shown in FIGS. 4 to 9, integrally comprising a drive force transmission means for transmitting a drive force which is given from an external unit. The specific embodiments will be described later in connection with FIGS. 8, 12, 13 and 14.

Figure 4:
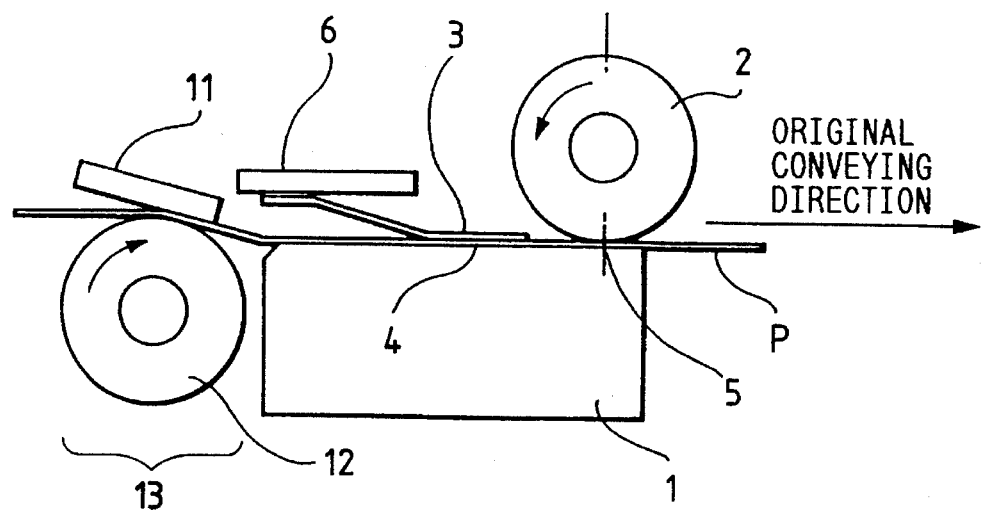
FIG. 4 is a cross-sectional view for explaining an original image reading device according to a first embodiment of the present invention.
Figure 5:
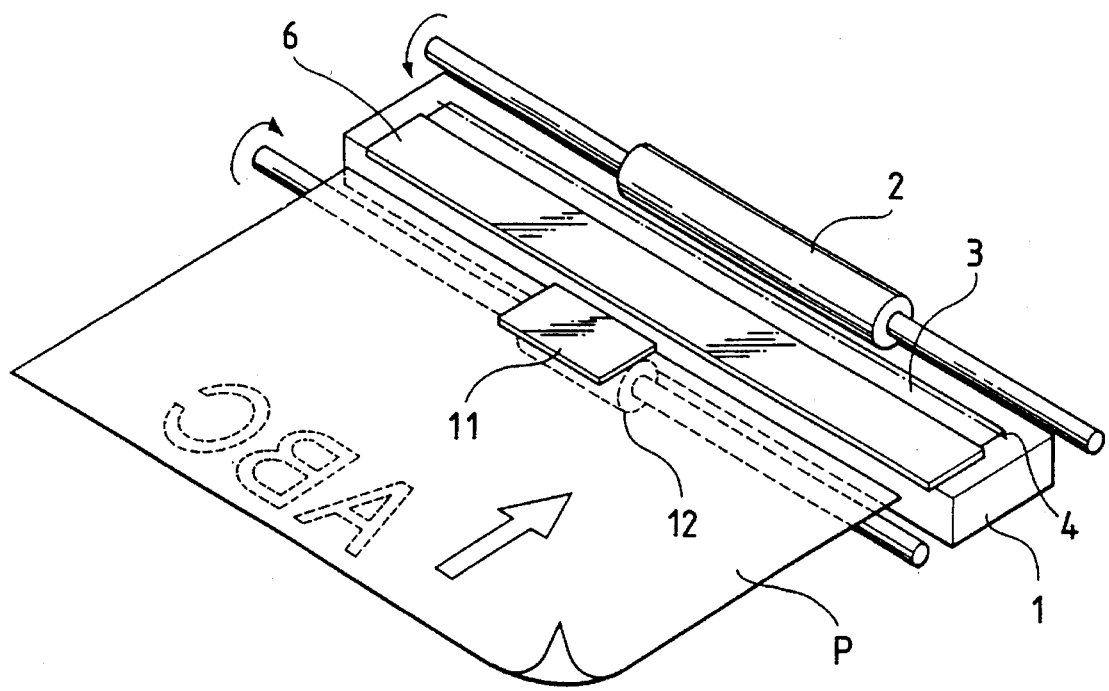
FIG. 5 is a schematic perspective view for the first embodiment.

FIG. 4 is a schematic cross-sectional view for showing an original image reading device according to the first embodiment of the present invention, and FIG. 5 is a schematic perspective view for showing the original image reading device as shown in FIG. 4.

Figure 3A:
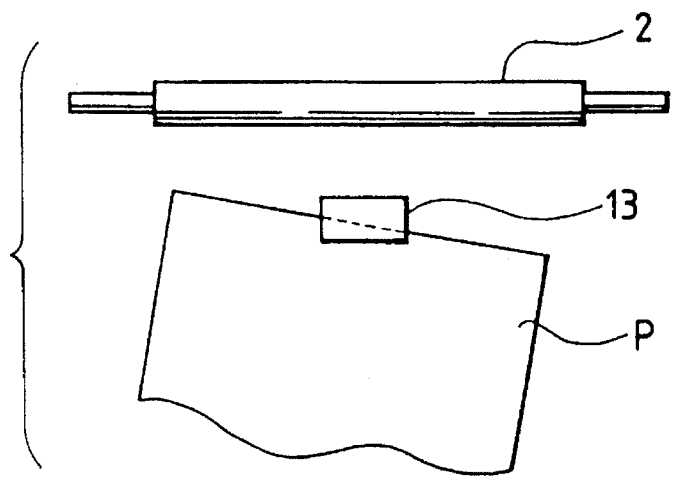
FIGS. 3A to 3C are views showing the state of transportation of an original in the original image reading device.
Figure 3B:
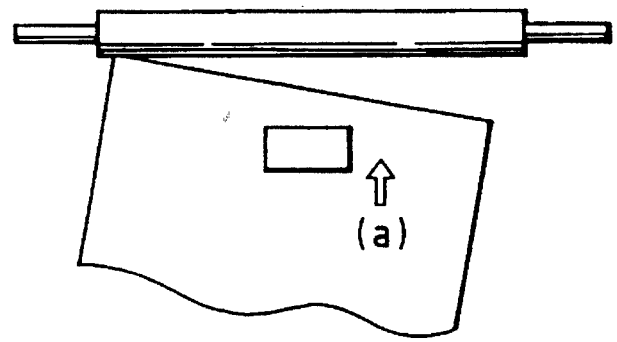
Figure 3C:
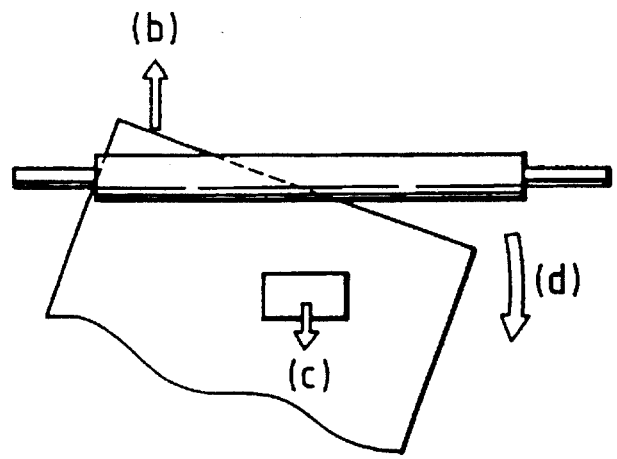
Figure 1:
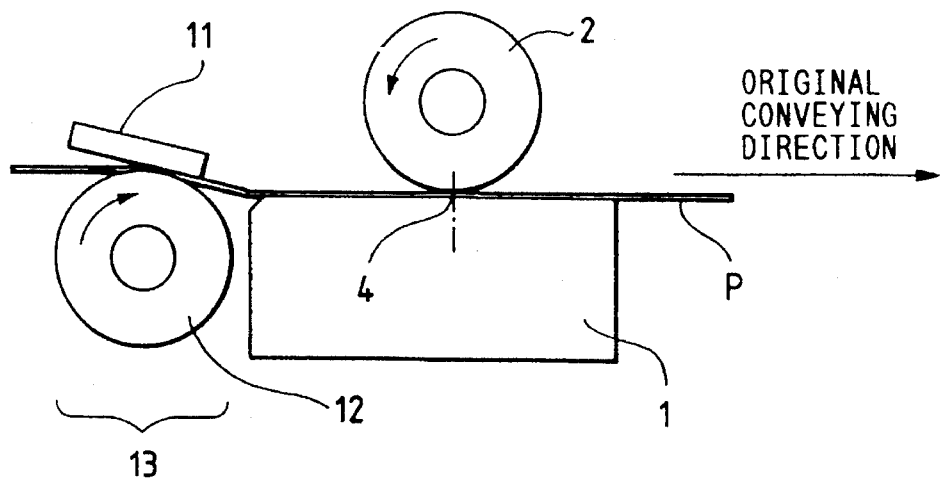
FIG. 1 is a schematic cross-sectional view of an original image reading device.
Figure 2:
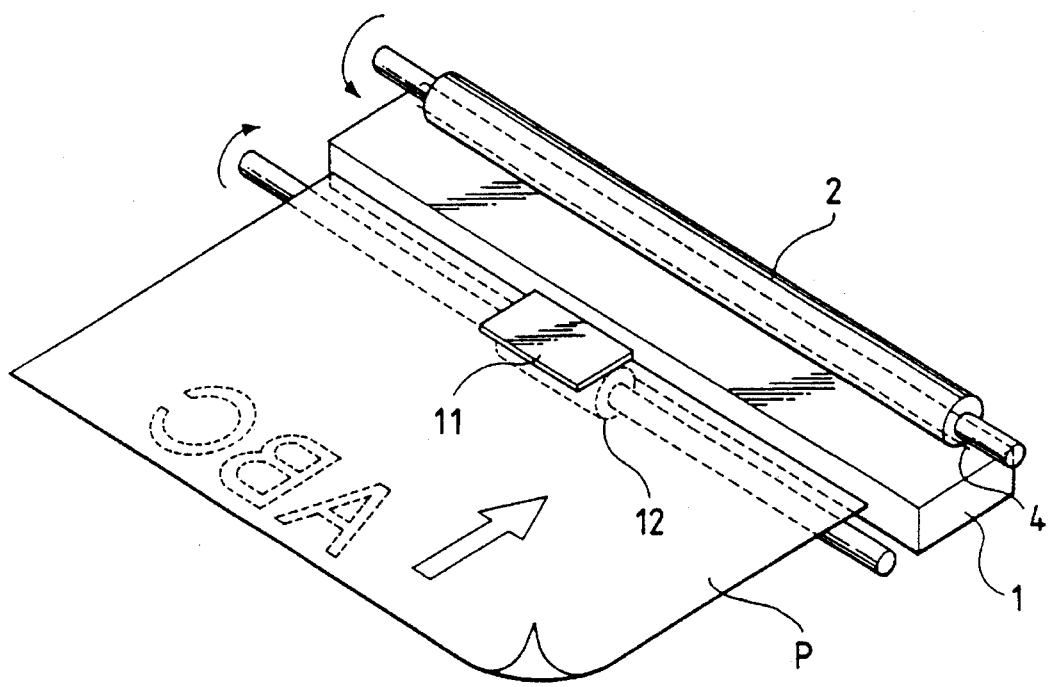
FIG. 2 is a schematic perspective view of the original image reading device as shown in FIG. 1.

FIGS. 4 and 5, 1 is a line sensor for reading the image of an original P, 2 is a platen roller for conveying the original P, and 3 is an original contact member for bringing the original P to be in tight contact with a reading position 4 of the line sensor 1. 13 is an automatic sheet feeding unit consisting of a combination of a separating member 11 and a sheet supplying roller 12. The original contact member 3 is disposed closer to the side of the original sheet feeding unit 13 from a contact point 5 between the line sensor 1 and the platen roller 2, and outside the nip of the platen roller 2.

The distance between the original contact member 3 and the platen roller 2 on the line sensor 1 is determined such that the original contact member 3 placed at a reading position 4 and the platen roller 2 may not mutually interfere. It should be noted that as the conveying force of the automatic sheet feeding unit 13 may in general become unstable due to change in quality of the paper used for the original, the distance between the original contact member 3 and the platen roller 2 is preferably as short as possible, and in practice, a distance of 2 mm to 5 mm is acceptable.

The platen roller 2 can be composed of EPDM (ethylene-propylene rubber), CR (chloroprene rubber), or silicone, for example. The original contact member 3 can be advantageously composed of a flexible member such as a plastic film of PE (polyethylene), PET (polyethylene terephthalate), PEEK (polyetheretherketone), nylon or fluorinated resin, or a metal foil such as aluminum foil or titanium foil. The thickness of the original contact member 3 is desirably 0.1 mm or less. The flexible member 3 is fixed at one end thereof to a support member 6 with an adhesive or fixing screws, and contacts at the other end with the reading position 4 of the line sensor 1, by the own weight or the spring property of the flexible member itself.

Figure 6A:
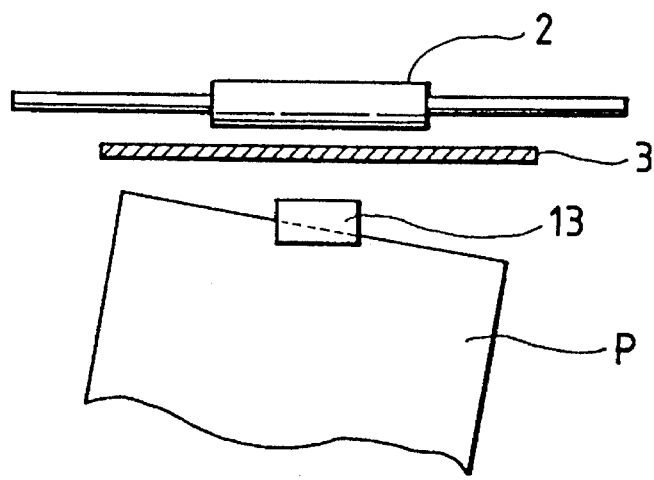
FIGS. 6A to 6C are views for explaining the sheet conveying states in the device of the first embodiment, respectively.
Figure 6B:
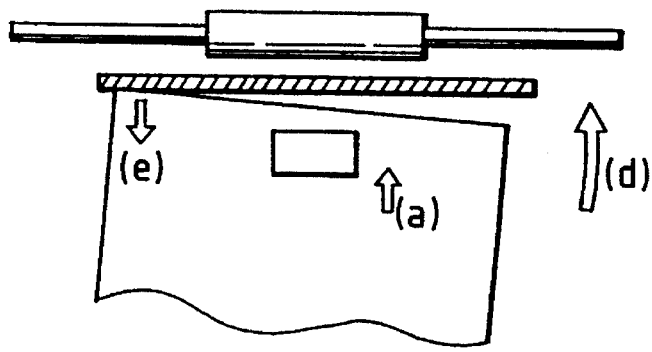
Figure 6C:
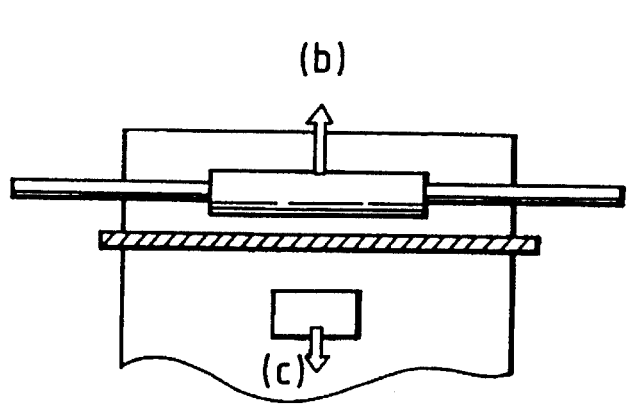

The foregoing embodiments could provide following advantages:

(1) As the platen roller 2 serves only for the transportation of the original, the rubber portion of the roller could be shortened, whereby it was rendered possible to reduce the influence of flatness of the reading plane of the line sensor and to achieve stable original transportation. Furthermore, cost reduction could be facilitated as the control of said flatness which was conventionally required was made easier;

(2) As the original transporting function and the original contacting function were separated into different members, there could be minimized the pressure required for transporting the original and the pressure required for contacting the original with the line sensor. Thus the pressure required for deforming the platen roller 2 for absorbing the unevenness on the surface of the line sensor was no longer required. For this reason the load on the motor could be reduced, and it was made possible to reduce the dimension and the cost of the motor;

(3) Skewed sheet advancement hardly took place even if the sheet was supplied in skewed manner. FIGS. 6A and 6C are schematic plan views from above of the reading device in the embodiment of the present invention, wherein the line sensor, not illustrated in these drawings, is positioned behind the platen roller 2 in the paper face. When an original P is supplied in skewed position as in FIG. 6A, the front end of said original P impinges on the original contact means 3, lacking the transporting function, thereby generating a resistance (e) as shown in FIG. 6B. The automatic feeding unit 13 exerts a feeding force (a) which, in cooperation with said resistance (e), generates a rotating force (d) serving to correct the position of the original P, whereby the original P is returned to a proper position. When said resistance (e) becomes distributed over the entire front end of the original, said feeding force (a) overcomes the resistance (e) and feeds the original into the platen roller 2. Referring to FIG. 6C, since the platen roller 2 is constructed short, there is scarcely generated a rotating force between the load (c) of the automatic feeding unit 13 and the transporting force (b) of the platen roller 2. For this reason, skew-free transportation of the original could be realized. Skewed advancement could be further prevented by aligning the center of the rubber portion of the platen roller 2, in the main scanning direction, with the center of the automatic original feeding unit 13 and with the center of effective reading length of the unrepresented line sensor;

(4) The original contact means 3 was made white in at least a part of the reading position, in order to avoid undesirable influence in case of reading an original on thin paper, transparent sheet or with a narrow width. Also there could be provided reference white color in multi-level image reading. More specifically, the output of the line sensor 1 can be electrically corrected for example by memorizing said output by the unit of bits, taking the reflectance of white area of the original contact means 3 as reference. The white area may be formed by constituting the original contact means 3 itself with a white material, or by white printing or painting on a surface, facing the original, of the means 3. Furthermore, a similar effect could be obtained also by Such printing or painting on a surface, opposite to said original, of transparent original contact means 3.

FIG. 7 is a schematic cross-sectional view of a second embodiment of the image reading device of the present invention, wherein original contact means is composed of an elastic member 3 and a spring 7. The elastic member 3 is composed of rubber or sponge, or a member structurally showing the elasticity. The spring 7 serving as the pressing means could be replaced by gravity, with similarly satisfactory effects.

FIG. 8 is a schematic cross-sectional view of a third embodiment of the image reading device of the present invention, wherein the original platen roller 2 is provided outside a line sensor 1. A backup idler roller 8 is pressed to the original platen roller 2 and serves to transport the original P by pinching the same in cooperation with the original platen roller 2. The original pressing means employs a flexible member 3 as shown in FIG. 4.

FIG. 9 is a schematic cross-sectional view of a fourth embodiment of the image reading device of the present invention, wherein at the contact point 5 of the original platen roller 2 in the embodiment as shown in FIG. 4, a member 10 (hereinafter called sliding member) which has a friction coefficient smaller than that between the reading plane of the line sensor 1 and the platen roller 2 is provided. The reading plane of the line sensor 1 is usually composed of glass, and the sliding member 10 is preferably composed of fluorinated resin. The sliding member 10 may be formed by printing, coating or adhesion on the reading plane of the line sensor 1, or may be provided on in other parts than the reading plane, such as a casing part of the line sensor 1 as long as it does not hinder the advancement of the original. Thus there could be obtained an advantage of driving the platen roller 2 with a light load even in the absence of the original P at the contact point 5 of the platen roller 2, whereby compactization of the motor and reduction of power consumption thereof could be effectively attained.

The drive force transmission means in the first to fourth embodiments as above described is preferably a mechanism such as a plurality of gears or a timing belt, not shown.

Figure 10:
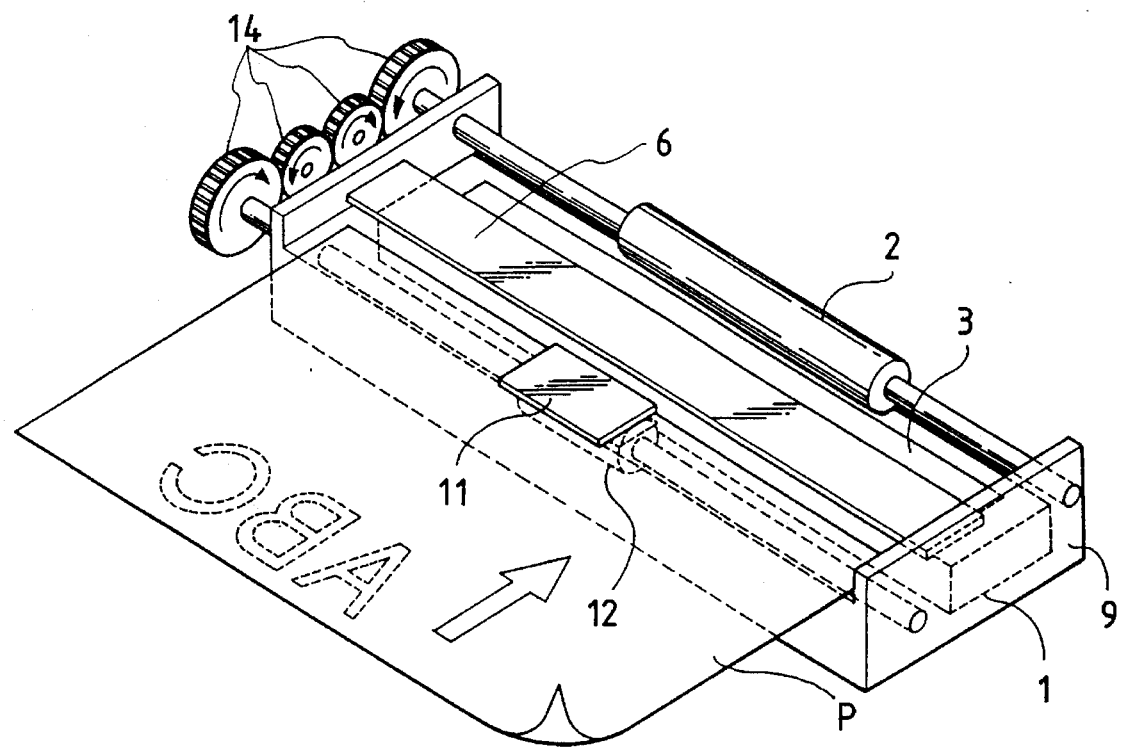
FIG. 10 is a schematic perspective view for explaining an original image reading device according to a fifth embodiment of the present invention.
Figure 11:
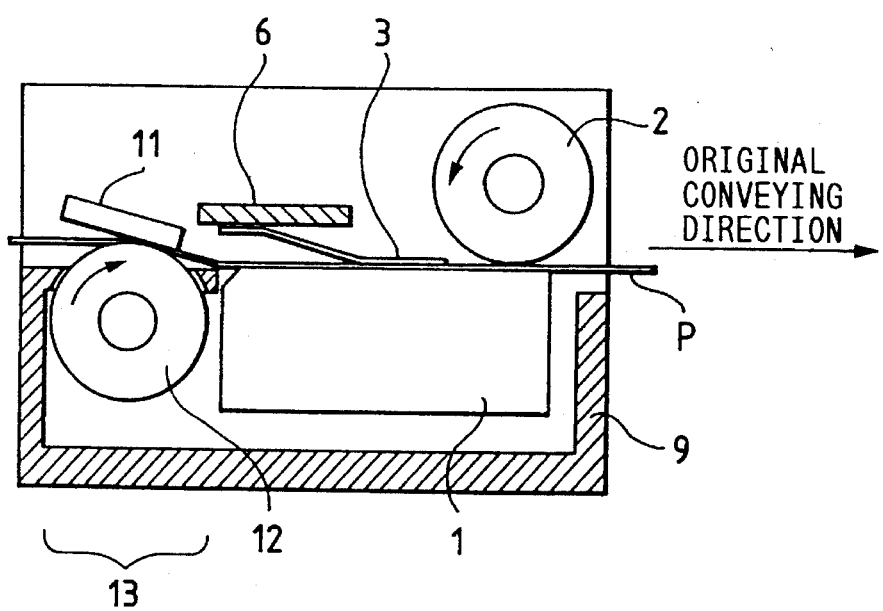
FIG. 11 is a schematic cross-sectional view for the fifth embodiment.

FIGS. 10 and 11 illustrates a fifth embodiment of the original image reading device exhibiting the characteristics of the present invention most effectively, wherein the original image reading device shown in FIG. 4 is constructed as an integral unit in a frame. A separating member 11 is supported by an unrepresented member and fixed to a frame 9. The frame 9 integrally supports a line sensor 1, a separating member 11, a feed roller 12, a platen roller 2 and original contacting means 3. The paper supplying roller 12 and the original platen roller 2 are driven by four gears 14 serving as a drive power transmission means for transmitting drive power from a driving power source provided within the apparatus body (for example, whole structure including a transmission means of the facsimile apparatus). Note that a belt can be used to transmit the drive force, instead of gears 14.

Figure 12:
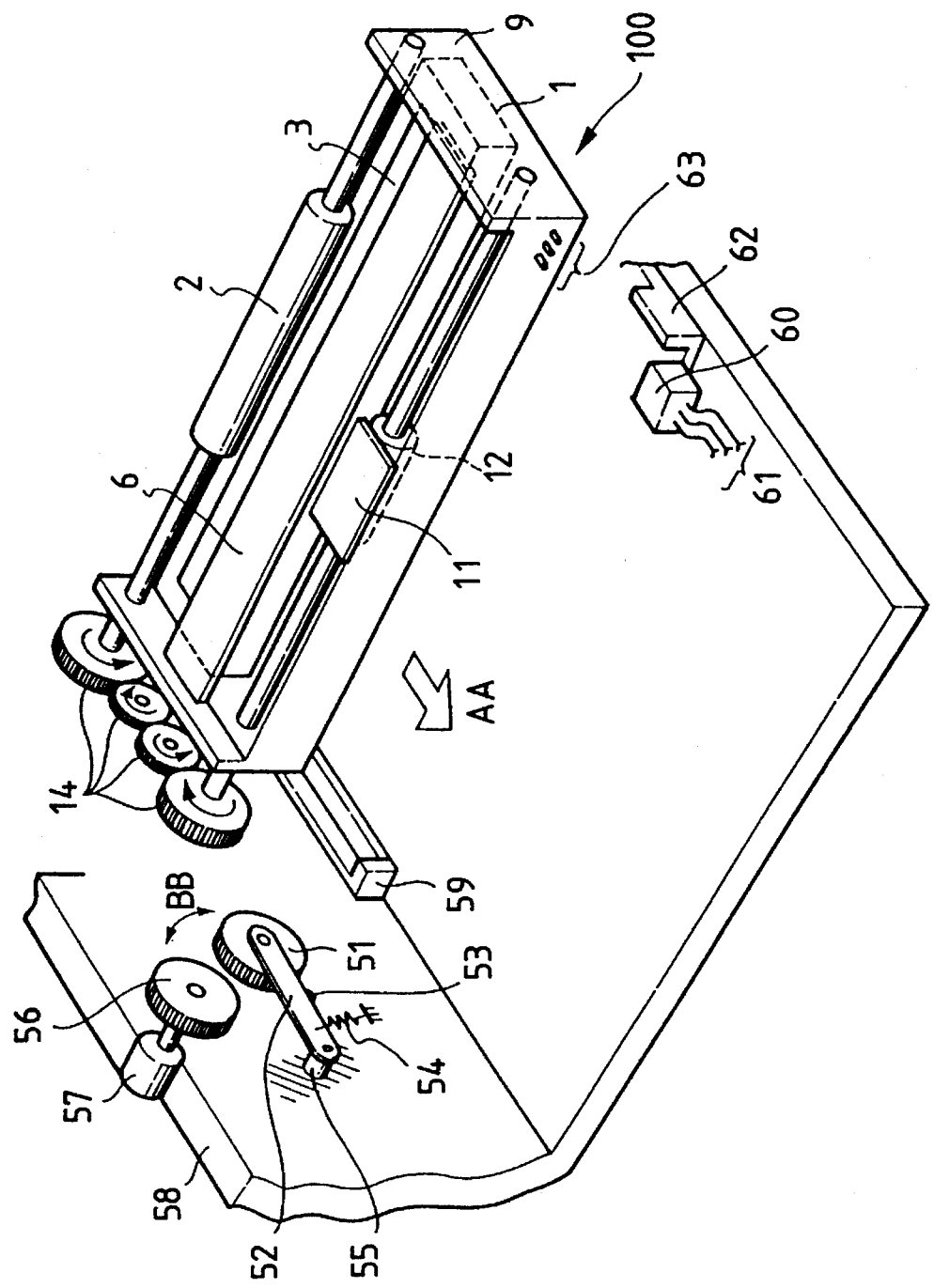
FIGS. 12 and 13 are operation explanation views for mounting the image reading device of the present invention onto an apparatus main body.

FIG. 12 is a schematic illustrative view showing combining the unit shown in FIG. 10 with the apparatus body. The unit 100 is moved and mounted along guides 59, 62 or fitting portions in parallel to a direction of an arrow AA. At an end of the longer guide 59, a stopper is provided. At an end of the shorter guide 62, a connector 60 also serving as a stopper is provided. The connector 60 is provided for electrical connection with a signal terminal 63 at a side of the unit 100. The signal terminal 63 include lines for transmitting a driving signal of the line sensor 1, an image signal from the line sensor 1, a reference signal, and is electrically connected to the apparatus body via a wiring 61 upon the contact with a connector 60, thereby being controllable each other.

At a frame 58 on the apparatus body side to which members 59 to 62 are secured, a motor 57 is provided as a driving source on a side wall thereof. The motor 57 is provided with a gear 56, which is engaged with a gearing 51 at the combining of the unit 100, thereby the driving power is transmitted via the gearing 51 to a gearing 14 at a side of the unit. By means of the driving power such transmitted, the rollers 2 and 12 are rotated. The gearing 51 is mounted on an arm 52 rotatable about an axis 55 fixed on the side wall, and pivotable about the axis 55 in a direction of arrow BB. When the unit 100 is not mounted, the arm 52 is biased downwardly by means of a spring 54. And at a lower position, a stopper 53 is provided to limit a pivotal movement of the arm 52 (FIG. 12). Also in this case, the driving power may be transmitted by means of a belt. When using the belt, it is possible to fulfill its function sufficiently, even if the aligning precision is possibly reduced.

Figure 13:
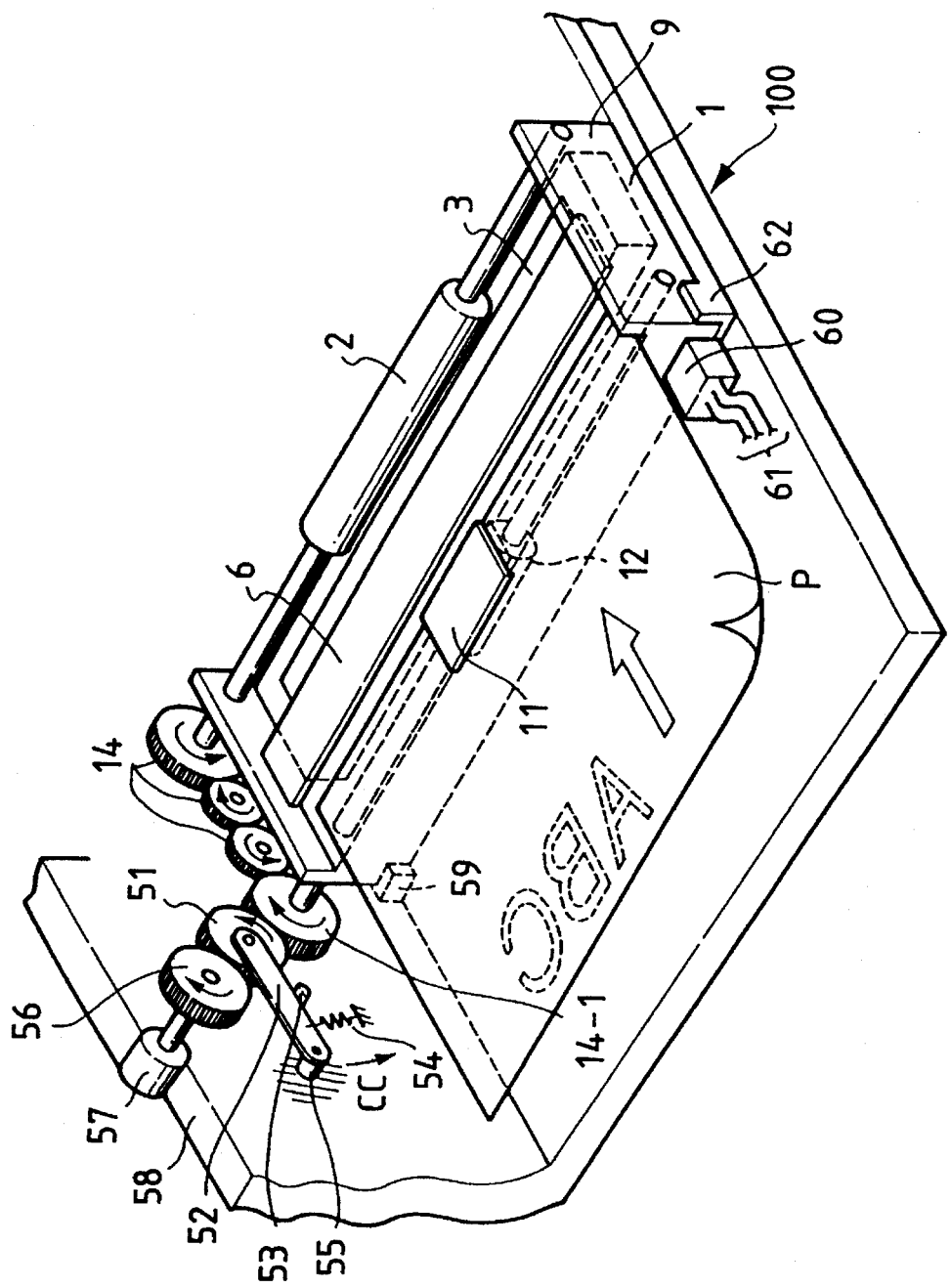

FIG. 13 shows a state wherein the unit 100 is completely combined with the body frame 58. As the unit 100 moves along the arrow AA (FIG. 12), among transmission gearings 14, the gear 14-1 provided on an axis of the paper supplying roller 12 is engaged with the gearing 51. By means of the gearing 14-1, the gearing 51 is pushed upwardly against a biasing CC, so as to engage with the gearing 56 of the driving power source. Further moving the unit 100, simultaneously with limiting movement of the stoppers 59 and 60, the electrical connection through the connector 60 is completed. In this time, the gearings 14-1, 51, 56 mesh with one another (FIG. 13).

Figure 14:
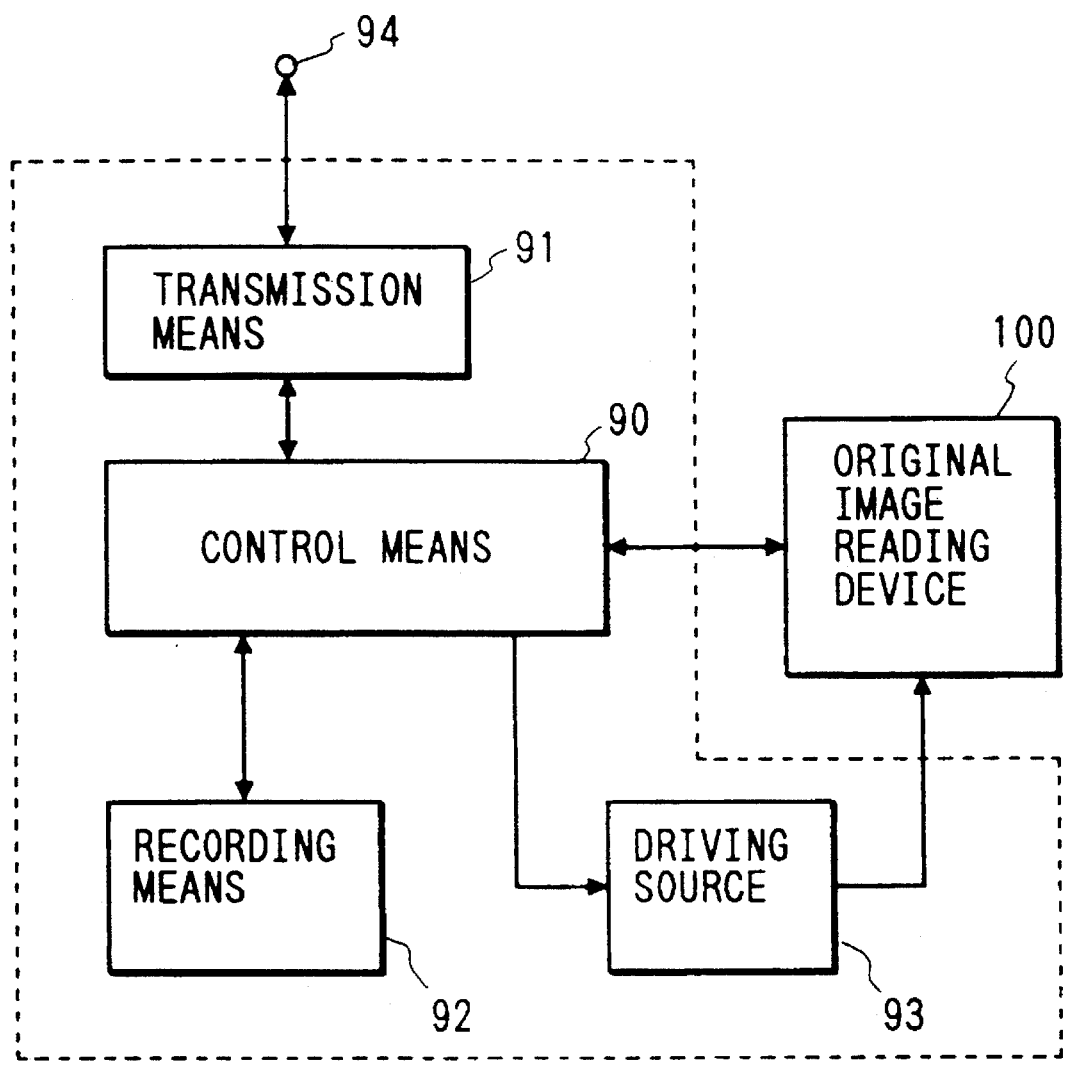
FIG. 14 is a block diagram for explaining a control system of the image reading device according to the present invention.

FIG. 14 shows, as a schematic block diagram, an example of a facsimile apparatus having an original image reading device according to the present invention. Upon inserting an original P in an original image reading device 100, and starting the transmission using a driving source 93, the device rotates a platen roller to transport the original, and reads image formation by means of a line sensor. This information is stored, as an electrical signal, into a memory of a control means 90. Further, upon connecting with an external circuit 94 connected via the transmission means 91 to an end to be transmitted, the image signal within the memory is transmitted via the transmission means.

Further, a recording means 92 records on a recording medium the image information transmitted. As such recording means, a thermal head, an ink jet recording head or the like may be used.

As explained in the foregoing, the original image reading device of the present invention is capable of resolving the skewed advancement, elevated cost and large motor dimension, which are conventionally in problem, thereby attaining reductions in the dimension, weight and cost which are desired particularly in recent years. Furthermore, a unit structure integrally containing the components in a frame can provide the following advantages.

(1) It is possible to improve the precision of assembly of the components relating to the original image reading.

(2) The unit can be standardized and incorporated in various models of the image information processing apparatus for significantly reducing the works involved in the designing, evaluation and manufacture, thereby achieving a total cost reduction of such apparatus.

(3) As the image reading device can be realized in a compact and light-weight unit, the layout in the image information processing apparatus is facilitated and the freedom of design is widened.

(4) In case of a defect or a malfunction of the image reading device incorporated in the image information processing apparatus, the trouble can be repaired by simple replacement of the unit by the operator without particular training, skill or tools.

As explained in the foregoing, the present invention provides a compact, light-weight and inexpensive image reading device, which is adapted for use in various image processing apparatuses, such as a facsimile, an image sensor, a computer, a word processor, a copying machine or the like.

The sixth embodiment of the present invention will be described below. According to this embodiment, there is provided an original image reading device in which original reading means for optically reading an image of an original, original convey means for conveying the original, drive force transmission means for transmitting a drive force from an external unit to the original convey means, original contact means for bringing the original to be in tight contact with a reading portion of the original reading means, and mounting and aligning means onto an image information processing apparatus are integrally arranged on a frame to constitute a unit structure, so that the device is mountable on the image information processing apparatus. Thus, the original image reading device, which can solve the subjects of the conventional apparatuses, and can meet recent requirements for a compact, lightweight, and inexpensive structure, diversified designs and functions, and the like, can be provided.

Figure 15:
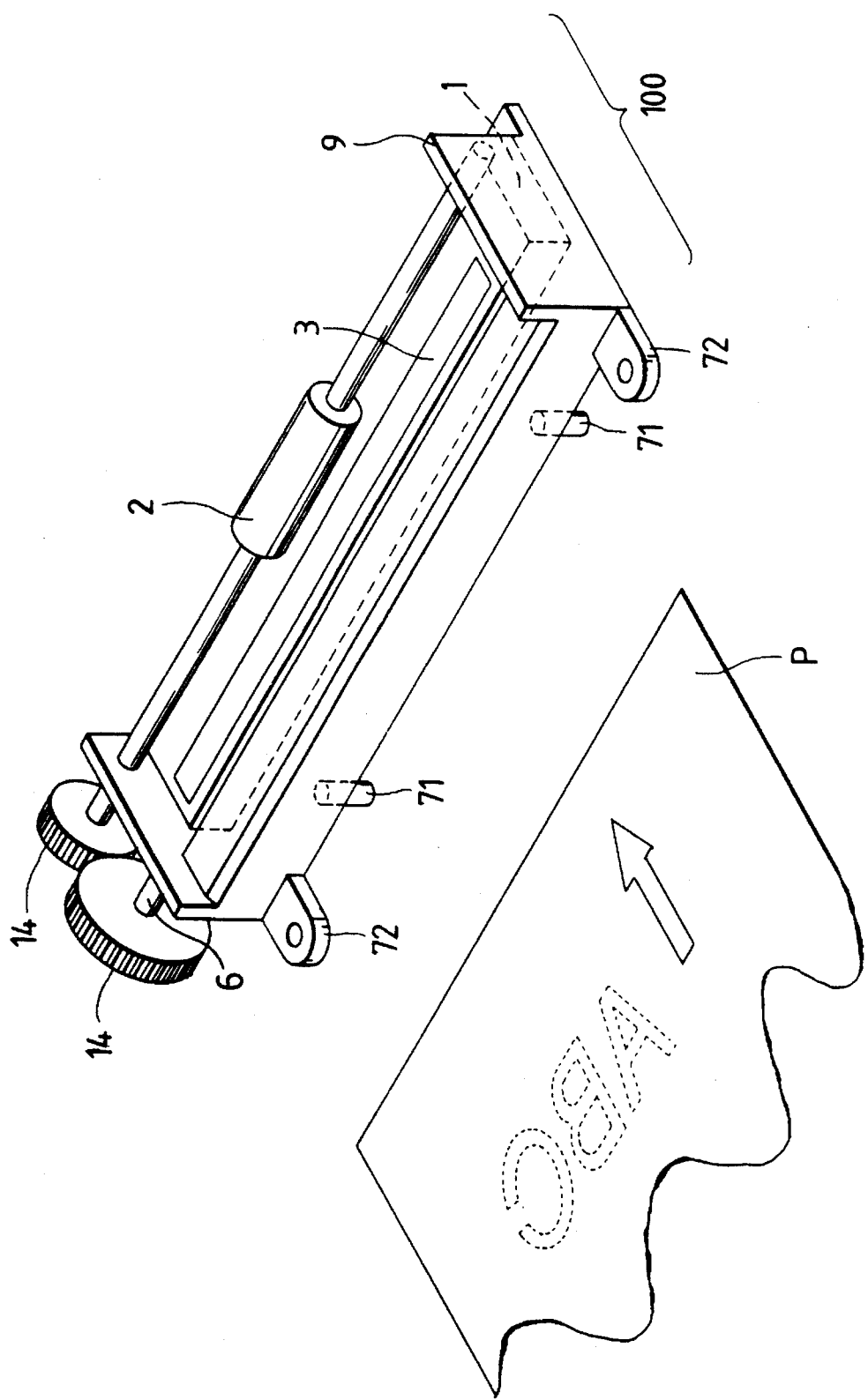
FIG. 15 is a schematic perspective view for explaining an original image reading device according to a sixth embodiment of the present invention.

Further, the sixth embodiment of the present invention will be described below with reference to FIG. 15, which is a schematic perspective view for explaining a structure of the original image reading device in this embodiment. An original image reading device 100 of this embodiment has a unit structure in which a line sensor 1 as an original reading means for optically reading an image of an original P, a platen roller 2 as an original convey means for conveying the original P, an original contact means for bringing the original P to be in tight contact with a reading portion of the line sensor 1, gears 14 as drive force transmission means for transmitting a drive force from an external unit to the platen roller 2, and a pin-like aligning means 71 are integrally locked on a frame 9. The aligning means 71 serves as a mounting and aligning member in incorporating the image reading device 100 into the image information processing apparatus, as will be described later. Although not shown in this embodiment, a spring may be arranged below the line sensor 1 to urge the line sensor 1 against the platen roller 2. Note that the gears 14 are attached to a shaft 6 arranged on the end portion of the frame, and a roller shaft. The original pressing means 3 is the same as shown in FIGS. 4 to 14.

Also, a mounting portion 72 is to secure the unit to the main body by means of a screw or the like, in attaching the unit as above described to the main body.

Figure 16:
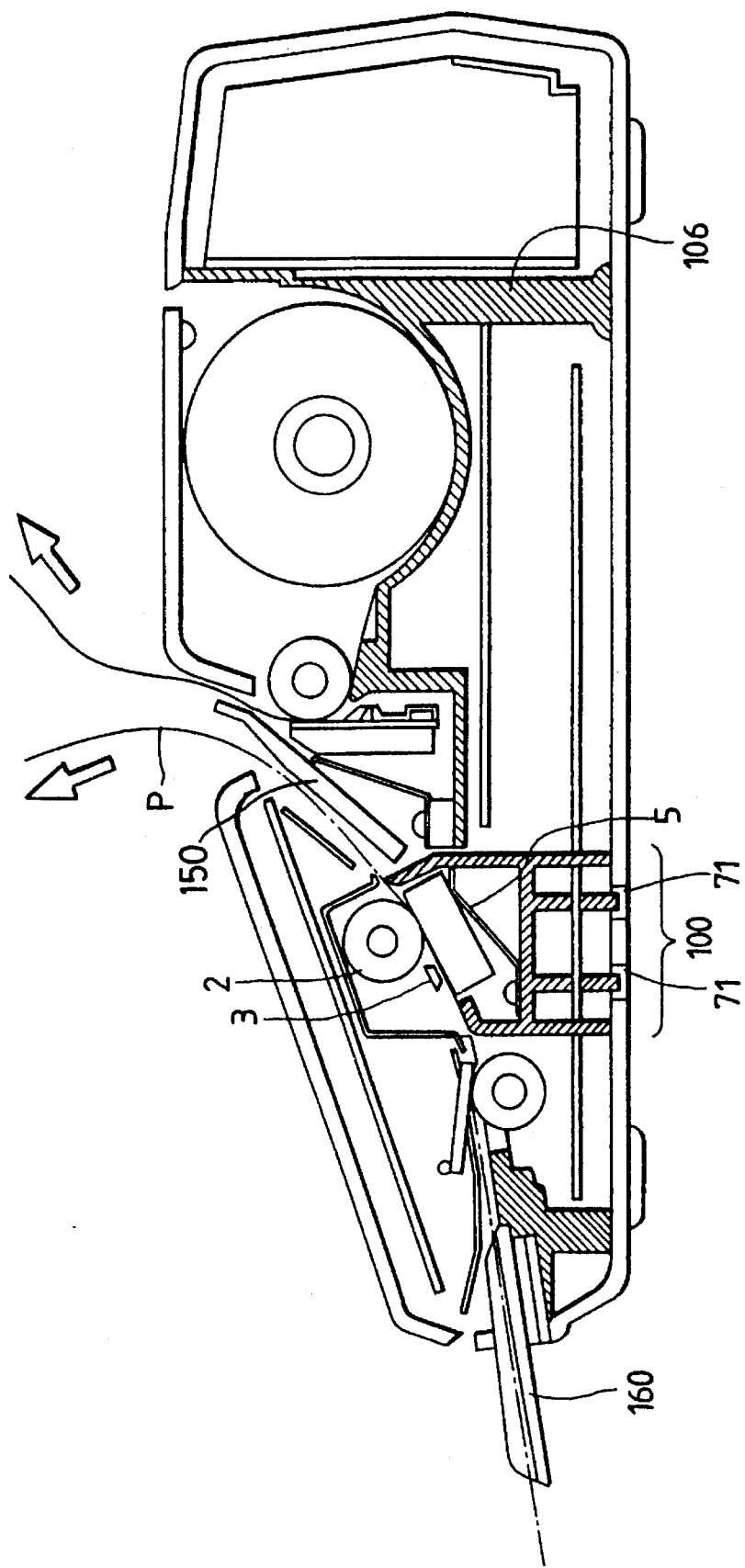
FIG. 16 is a schematic cross-sectional view for the sixth embodiment.

FIG. 16 is a schematic sectional view for explaining the structure of a facsimile apparatus as an image information processing apparatus which mounts the original image reading device 100 of this embodiment in a main body. Note that the same reference numerals in the figure denote the same parts as in the previous embodiments. In this embodiment, the original image reading device 100 is mounted not to be integrally locked on a main body frame 106, but to be detachably locked on a bottom plate separate from the main body frame 106. Note that 5 is a spring not shown in FIG. 15.

In this embodiment, when the original image reading device 100 is mounted on the bottom plate, the relative position between the device 100 and the respective components in the image information processing apparatus is determined using the aligning means 71. When the original image reading device 100 is mounted, mounting position precision for connections between a drive source (not shown) and the gears 14, and mounting position precision for sheet path formation for allowing the smooth flow of the original P from an original table 160 of an image information processing apparatus to the entrance of the original image reading device 100, and the smooth flow of the original P from the exit of the original image reading device 100 to a sheet guide 150, are important in the relative positional relationship between the device 100 and surrounding components. In this embodiment, when the original image reading device 100 is assembled, the pin-like aligning means 71 is fitted in a hole formed in the bottom plate, thereby aligning the original image reading device 100. Thereafter, the original image reading device 100 is fixed on the bottom plate using a mounting means, not shown, such as a screw. Therefore, the original image reading device 100 can be automatically fixed at the predetermined position on the bottom plate. As a result, the drive source and the gears can be satisfactorily connected, and the sheet path can also be satisfactorily formed.

This embodiment exemplifies an aligning operation using a pin, and a mounting operation using a screw. However, the present invention is not limited to this. The aligning and mounting methods may be appropriately selected in consideration of necessary relative positional precision, a necessary mounting force, a mounting method, and the like. A facsimile apparatus was exemplified as the image information processing apparatus, and besides, the present invention is also applicable to a computer, a word processor, a copying machine or the like.

The original image reading device, and the image information processing apparatus mounting the device, can solve the conventional above-mentioned subjects. More specifically, (1) As itemized in the following, the assembling position precision and parts precision can be improved.

① The original image reading device has a structure in which the original reading means, the original convey means, the original contact means, the drive force transmission means, and mounting/aligning means onto the image information processing apparatus are integrated on the frame, and is independently detachable from the main body frame of the image information processing apparatus. Therefore, the assembling position precision of the original image reading device does not depend on a decrease in rigidity of the main body frame upon realization of the compact, lightweight structure, thus easily assuring the assembling position precision.

② Since the necessary gears are attached to the shafts arranged on the frame, the position precision can be easily assured.

③ Since the assembling position precision, and the parts precision can be assured, the conveyance of original image is improved and a compact, lightweight structure can be realized.

④ Since the original image reading device has aligning means for determining the relative position when it is mounted on the image information processing apparatus, the mounting on the apparatus frame is easy, and the image information processing apparatus only needs the high precision at necessary portions, or the reinforced frame, the lightweight and compact apparatus can be accomplished.

(2) Loads and total cost upon changes in design and function can be reduced.

① The original image reading device has a structure in which the original reading means, the original convey means, the original contact means, the drive force transmission means, and the mounting/aligning means onto the image information processing apparatus are integrated on the frame, and is independently detachable from the main body frame of the image information processing apparatus. Therefore, the layout in the image information processing apparatus can be desirably made, and the degree of freedom of the design of the image information processing apparatus can be increased.

② When the functions of the image information processing apparatus are to be changed, the original image reading device of this embodiment can be standardized and assembled, thus reducing design and development loads. In addition, since design evaluation and examination terms can be shortened, diversified requirements can be readily met.

(3) Replacement is easy when a defect or malfunction is found.

① Since the original image reading device has a structure in which the original reading means, the original convey means, the original contact means, the drive force transmission means, and the mounting/aligning means onto the image information processing apparatus are integrated on the frame, the function check test of the original image reading device can be conducted before the device is assembled in the image information processing apparatus. Therefore, a defect of the original image reading device can be found early.

② Even when the original image reading device malfunctions during use of the image information processing apparatus, the original image reading device unit need only be replaced. Thus, a user himself or herself can easily repair the device even if he or she has no special education, technique, and tools.

Figure 17:
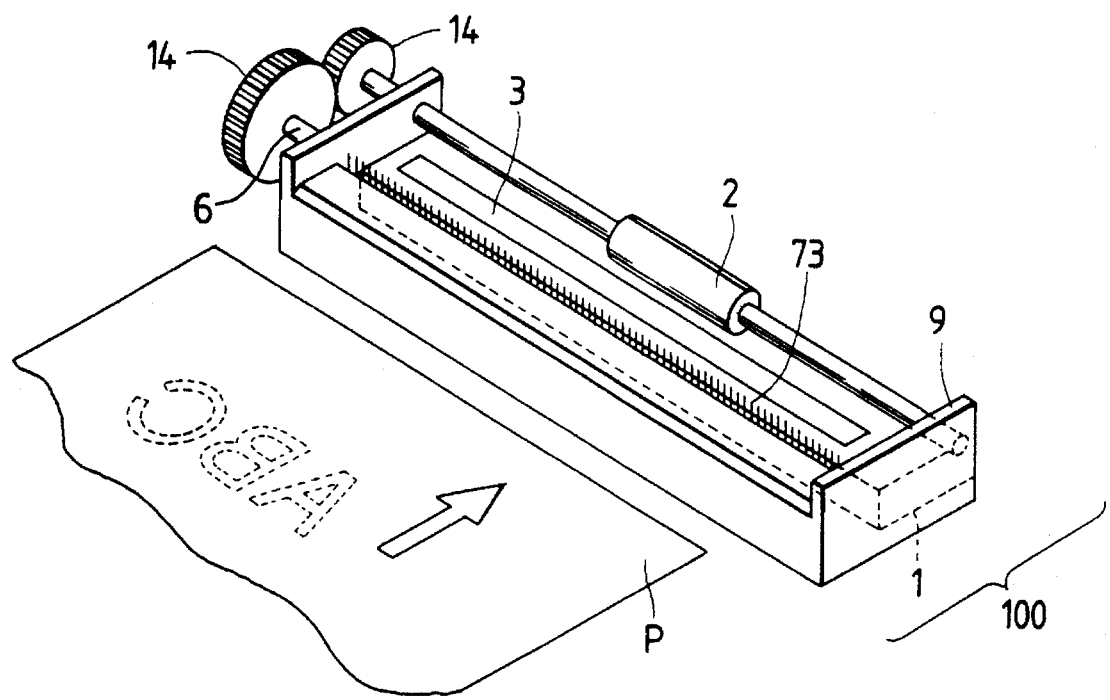
FIG. 17 is a schematic perspective view for explaining an original image reading device according to a seventh embodiment of the present invention.

The seventh embodiment of the present invention will be described below with reference to FIG. 17. An original image reading device of this embodiment has a unit structure in which original reading means for optically reading an image of an original, original convey means for conveying the original, drive force transmission means for transmitting a drive force from an external unit to the original convey means, original contact means for bringing the original to be in tight contact with a reading portion of the original reading means, and discharging means for discharging the original, are integrally arranged on a frame. Therefore, the image information processing apparatus mounting the original image reading device can solve the subjects of the conventional apparatuses, and can meet recent requirements for a compact, lightweight, and inexpensive structure, diversified designs and functions, and the like. In an original image reading device 100 of this embodiment, a line sensor 1 as an original reading means for optically reading an image of an original P, a platen roller 2 as an original convey means for conveying the original P, an original contact means 3 for bringing the original P to be in tight contact with the reading portion of the line sensor 1, gears 14 as a drive force transmission means for transmitting a drive force from an external unit to the platen roller 2, are integrally locked on a frame 9. A spring, not shown, may be arranged below the line sensor 1 to urge the line sensor 1 against the platen roller 2. Note that the gears 14 are attached to a shaft 6 arranged on the end portion of the frame, and a roller shaft.

It should be noted that the discharging means 73 is disposed beneath the original P (on the reading face side) in this embodiment, but it may be disposed above the original P (on the back face side). The discharging means is preferably connected to a ground electrode via wiring lines, not shown. The device as shown in FIG. 17 is mountable on the apparatus main body as shown in FIGS. 12, 13, 14 and 16.

In this embodiment, the discharging means has been already disposed in the original image reading device, it is unnecessary to cope with it on the image information processing apparatus side. If necessary, the discharging means in the original image reading device only needs to be connected to the ground electrode.

The eighth embodiment of the present invention will be described below. According to this embodiment, the original image reading device has a unit structure in which original reading means for optically reading an image of an original, original convey means for conveying the original, drive force transmission means for transmitting a drive force from an external unit to the original convey means, original contact means for bringing the original to be in tight contact with a reading portion of the original reading means, and light-shielding means for shielding external light, are integrally arranged on a frame. Thus, the image information processing apparatus mounting the device can solve the subjects of the conventional apparatuses, and can meet recent requirements for a compact, lightweight, and inexpensive structure, diversified designs and functions, and the like.

Figure 18:
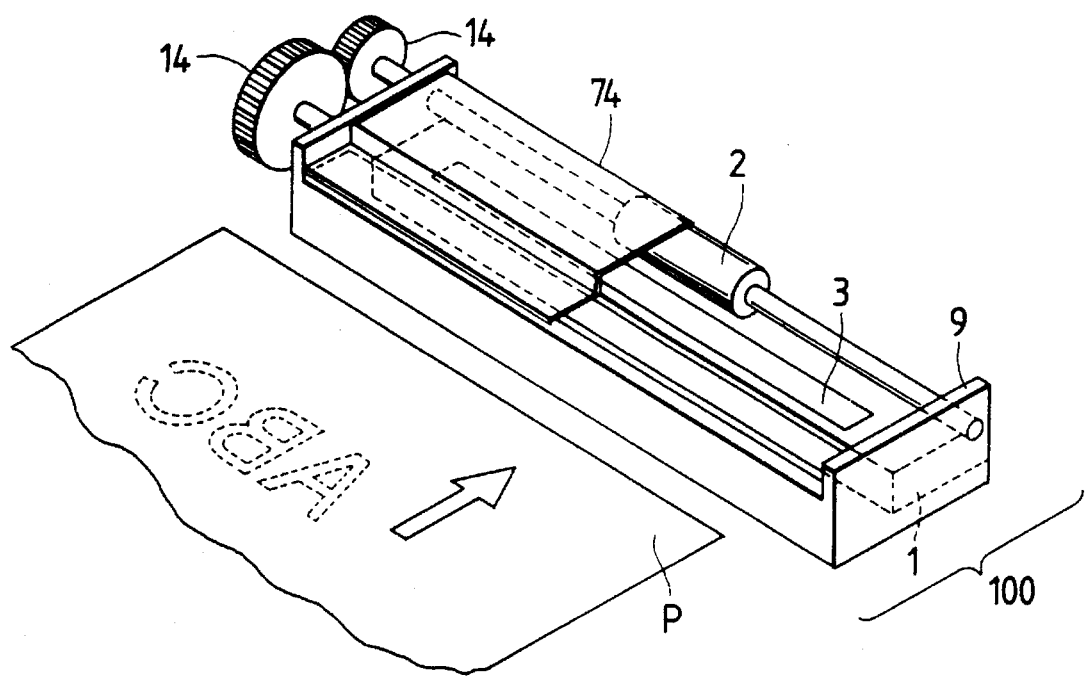
FIG. 18 is a schematic perspective view for explaining an original image reading device according to an eighth embodiment of the present invention.
Figure 19:
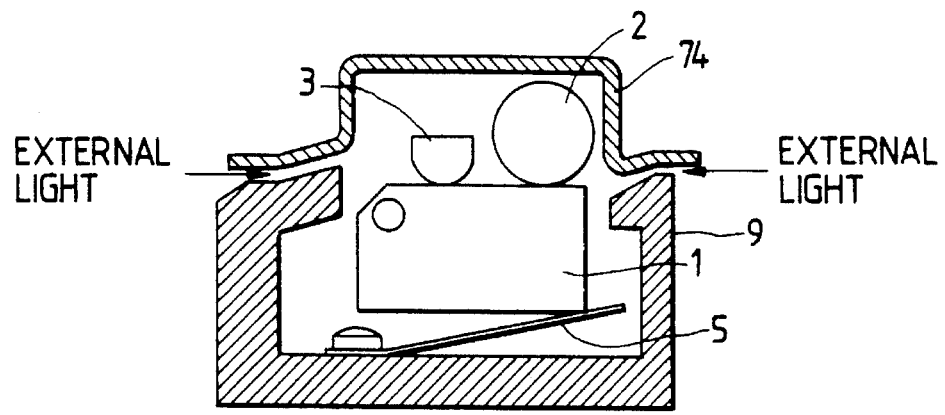
FIG. 19 is a schematic cross-sectional view for the eighth embodiment.

FIGS. 18 and 19 show the eighth embodiment of the present invention. FIG. 18 is a schematic view for explaining the structure of an original image reading device of this embodiment, and FIG. 19 is a schematic sectional view when viewed from the main scanning direction of the original image reading device shown in FIG. 18. In an original image reading device 100 of this embodiment, a line sensor 1 as an original reading means for optically reading an image of an original P, a platen roller 2 as an original convey means for conveying the original P, an original contact means 3 for bringing the original P to be in tight contact with the reading portion of the line sensor 1, gears 14 as a drive force transmission means for transmitting a drive force from an external unit to the platen roller 2, and a light-shielding cover 74 are integrally locked on a frame 9. As shown in FIG. 19, a spring 5 may be arranged below the line sensor 1 to urge the line sensor 1 against the platen roller 2. Note that the gears 14 are attached to a shaft arranged on the end portion of the frame, and a roller shaft. The light-shielding cover 74 is shown for only a half thereof in FIG. 18, and secured to the frame 9 with screws or the like. In this embodiment, external light (stray light) is shielded by the light-shielding cover 74 and the frame 9, as shown in FIG. 19. In this case, the frame 9 must be formed of a light-shielding material since it is one constituting element of the light-shielding means. In this way, the device as shown in FIGS. 18 and 19 is mountable on the apparatus main body as shown in FIGS. 12, 13, 14, and 16.

According to this embodiment, countermeasures against external light (stray light) due to a compact structure, and changes in design and functions can be easily taken. As a result, an inexpensive structure, and a short development term can be realized. In order to realize a compact structure, for example, when a main body frame, an operation panel, and the like, are rendered compact, the entrance and the exit of an original must be inevitably arranged near the original image reading device. However, since the original image reading device has a structure in which the original reading means, the original convey means, the original contact means, the drive force transmission means, and the light-shielding means for shielding external light are integrated in a frame, no countermeasure against incidence of external light (stray light) need be taken. Therefore, since external light-shielding means such as a light shutter need not be arranged, an inexpensive structure, and a short development term can be realized.

The ninth embodiment will be described below with reference to FIGS. 20 and 21. According to this embodiment, an original image reading device 100 has a unit structure in which a line sensor 1 as an original reading means for optically reading an image of an original P, a platen roller 2 as an original convey means for conveying the original P, an original contact means 3 for bringing the original P to be in tight contact with a reading portion of the line sensor 1, gears 14 as drive force transmission means for transmitting a drive force from an external unit to the platen roller 2, are integrally arranged and locked on a frame. A spring, not shown, may be arranged below the line sensor 1 to urge the line sensor 1 against the platen roller 2. Note that the gears 14 are attached to a shaft 6 arranged on the end portion of the frame, and a roller shaft. An image correction means is not shown in FIG. 20.

Figure 20:
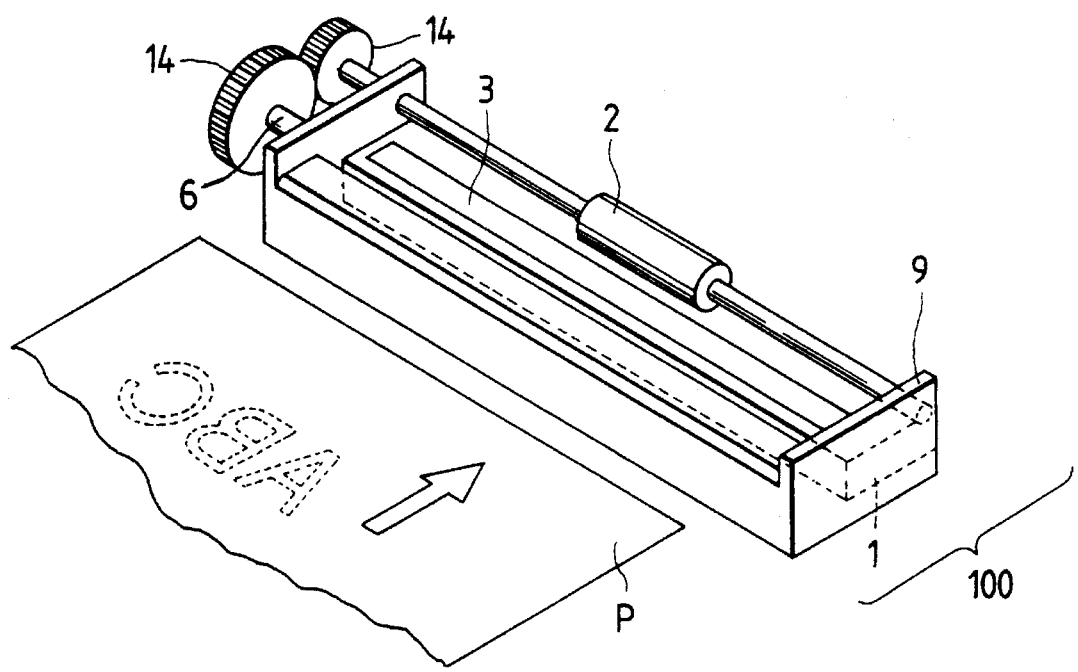
FIG. 20 is a schematic perspective view for explaining an original image reading device according to a ninth embodiment of the present invention.
Figure 21:
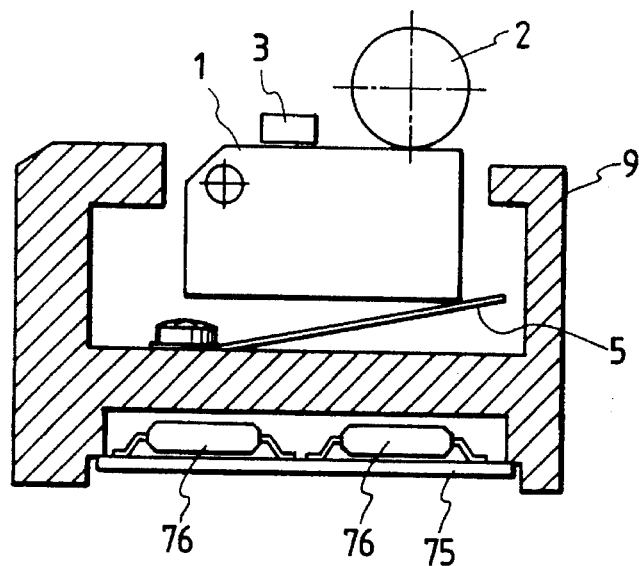
FIG. 21 is a schematic cross-sectional view for the ninth embodiment.

In FIG. 21, numeral 5 is a spring, not shown in FIG. 20, and 75 is an image correction device. In this embodiment, the image correction device 75 is arranged on the lower portion of the frame 9, and is connected to the line sensor 1 through wiring lines (not shown). An image correction output signal from the image correction device 75 is output to an image processing board or a system control board mounted on the main body such as FAX through wiring lines (not shown). Numeral 76 designates electronic components such as IC constituting the image correction device 75. This device as shown in FIGS. 20 and 21 is mountable on the apparatus main body as shown in FIGS. 12, 13, 14 and 16.

In this embodiment, since the image correction device 75 is a small-scale image correction circuit, such as a shading correction circuit, the image processing board is arranged in the image information processing apparatus to execute brightness correction, binary/multi-value image processing, or the like. However, the correction function of the image correction device 75 is not limited to that in this embodiment, and the image correction device 75 should be designed in consideration of various conveniences. Therefore, if the function of the image processing board itself can be integrated on the image processing apparatus 75, the image processing board may be omitted from the main body.

As above described, the image information processing apparatus in this embodiment can solve the technical subjects of the conventional apparatuses, and can meet recent requirements for a compact, lightweight, and inexpensive structure, diversified designs and functions, a short development term, and the like.

The tenth embodiment of the present invention will be described below. According to this embodiment, the original image reading device can also solve the subjects of the conventional apparatuses, and can meet recent requirements for a compact, lightweight, and inexpensive structure, diversified design and functions, and the like, like the previously-described embodiments.

Figure 22:
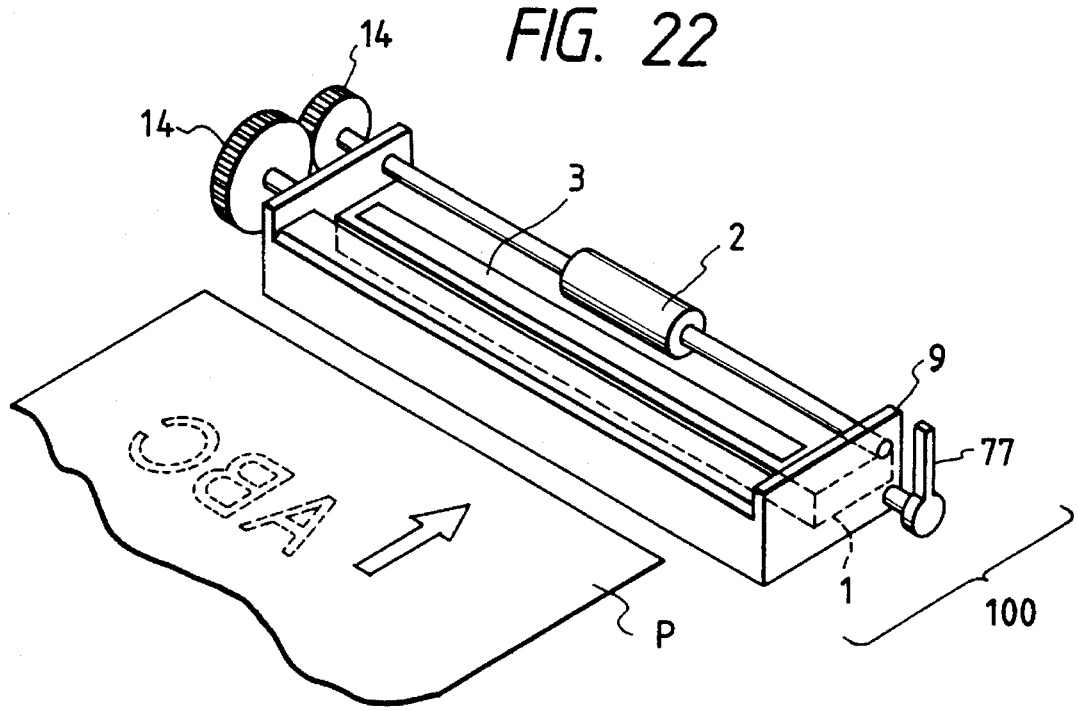
FIG. 22 is a schematic perspective view for explaining an original image reading device according to a tenth embodiment of the present invention.
Figure 23:
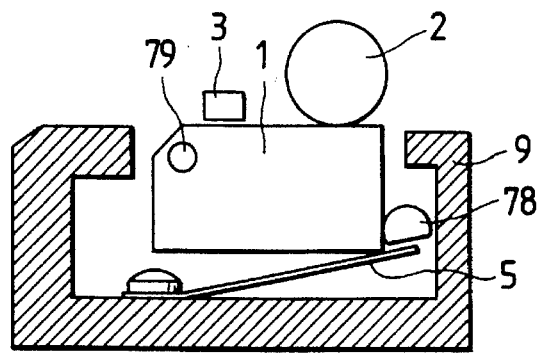
FIGS. 23 and 24 are schematic cross-sectional views for the tenth embodiment.
Figure 24:
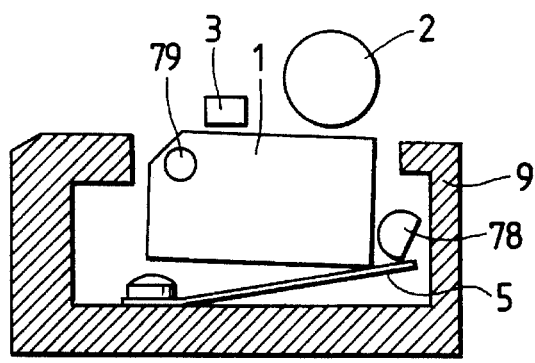

In FIGS. 22, 23 and 24, an original image reading device 100 has a unit structure in which a line sensor 1 as an original reading means for optically reading an image of an original P, a platen roller 2 as an original convey means for conveying the original P, an original contact means 3 for bringing the original P to be in tight contact with a reading portion of the line sensor 1, gears 14 as drive force transmission means for transmitting a drive force from an external unit to the platen roller 2, and a release lever 77 as an release means for removing the jamming original P, when a convey error such as paper jam occurs during a convey operation of the original P, are integrally locked on a frame 9. As shown in FIGS. 23 and 24, a spring 5 is arranged on the lower portion of the line sensor 1, so that the line sensor 1 is urged against the platen roller 2. Note that the gears 14 are attached to a shaft arranged on the end portion of the frame, and a roller shaft.

FIGS. 23 and 24 are schematic sectional views when viewed from the main scanning direction of the line sensor 1 in the original image reading device shown in FIG. 22. The line sensor 1 is supported on the frame 9 to be rotatable about fulcrums 79 arranged at two ends in the main scanning direction as the central axis. The spring 5 is arranged below the line sensor 1, such that one end of the spring 5 is fixed to the inner wall surface of the frame 9, and the other end thereof is in contact with the lower surface of the line sensor 1. The line sensor 1 is pressed upward by the biasing force of the spring. As a result, the line sensor 1 contacts the platen roller 2 with a proper contact force, as shown in FIG. 23. A shaft 78 of the above-mentioned release lever 77 is arranged on the distal end portion of the spring 5. The shaft 78 has a rotatable structure, and serves as a cam for pressing the distal end of the spring 5 upon its rotation, and releasing the pressing operation of the line sensor 1 against the platen roller 2, as shown in FIG. 24.

Normally, the line sensor 1 is in contact with the platen roller 2 by the biasing force of the spring, as shown in FIG. 23, and the original P is fed between the line sensor 1 and the platen roller 2. The original P is fed forward upon rotation of the platen roller 2, and image information on the original P is sequentially optically read by the line sensor 1 simultaneously with the original feed operation. A convey error such as paper jam may occur between the line sensor 1 and the platen roller 2 during a convey operation of the original P depending on the thickness and paper quality of the original P, use environmental conditions, e.g., humidity, temperature, and the like. When such a convey error occurs, the release lever 77 is turned to rotate the shaft 78, so that the line sensor 1 is moved slightly downward by the cam operation of the shaft 78, as shown in FIG. 24. In this manner, the line sensor 1 is separated from the platen roller 2, and the contact means 3, so that the original causing the convey error can be easily removed. This device as shown in FIGS. 22, 23 and 24 is mountable on the apparatus main body as shown in FIGS. 12, 13, 14, and 16.

According to this embodiment, even when a convey error of an original occurs in the original image reading device during a use of the image information processing apparatus, since the original release means is arranged in the frame, the original can be easily removed.

Figure 25:
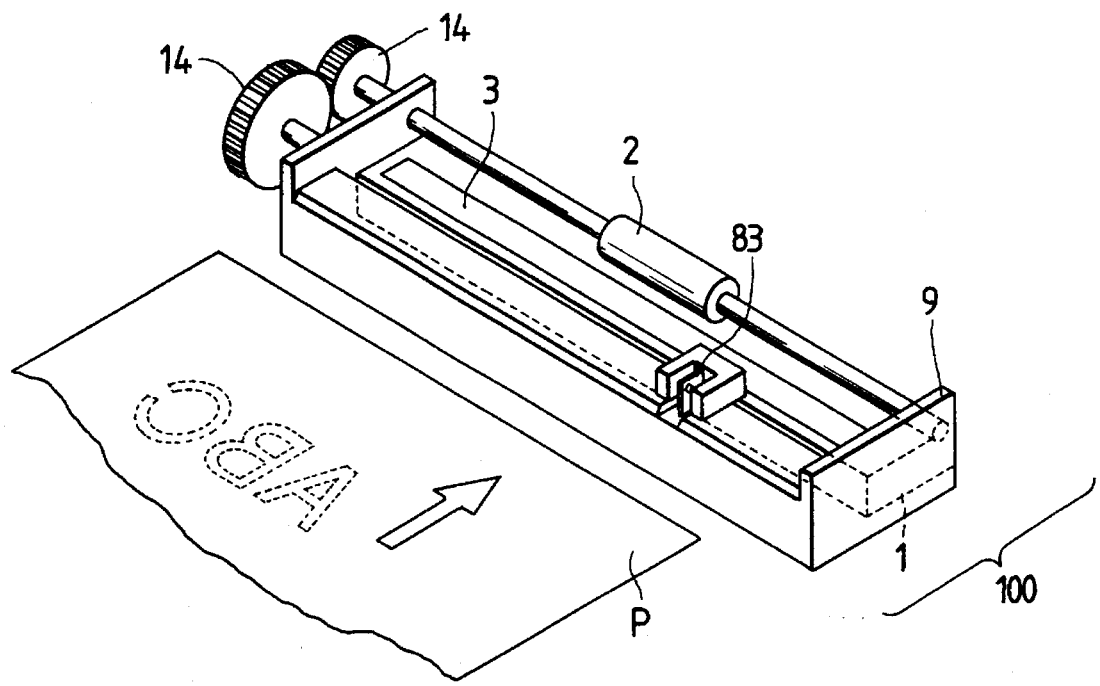
FIG. 25 is a schematic perspective view for explaining an original image reading device according to an eleventh embodiment of the present invention.
Figure 26:
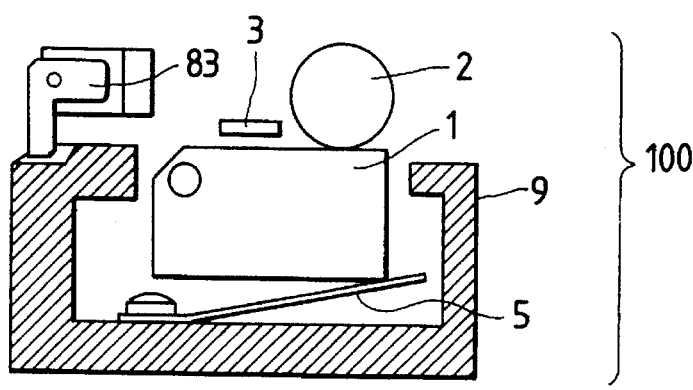
FIG. 26 is a schematic cross-sectional view for the eleventh embodiment.

The eleventh embodiment of the present invention will be described below with reference to FIGS. 25 and 26. An original image reading device 100 of this embodiment has a unit structure in which a line sensor 1 as an original reading means for optically reading an image of an original P, a platen roller 2 as an original convey means for conveying the original P, an original contact means 3 for bringing the original P to be in tight contact with a reading portion of the line sensor 1, gears 14 as drive force transmission means for transmitting a drive force from an external unit to the platen roller 2, and an original end portion detection sensor 83 as an original detection means for detecting the leading and trailing end portions of the original P, are integrally locked on a frame. As shown in FIG. 26, a spring 5 may be arranged below the line sensor 1 to urge the line sensor 1 against the platen roller 2. Note that the gears 14 are attached to a shaft arranged on the end portion of the frame, and a roller shaft.

In this embodiment, when the original P is fed to the original image reading device 100, and the original end portion detection sensor 83 detects the leading end of the original P, the original end portion detection sensor 83 generates a detection signal as a start signal for starting the line sensor 1, and a drive force source such as an external motor.

Upon reception of the start signal, the external drive force source starts its operation, and a drive force is transmitted to the platen roller 2 through the gears 14. The platen roller 2 begins to be rotated by the transmitted drive force, and starts an original feed operation for conveying the original P in a state adjacent to the surface of the line sensor 1. The line sensor 1 also starts an original reading operation, upon receiving the start signal, and optically reads image information on the original P passing above the reading portion of the line sensor 1.

The original P is conveyed by the platen roller 2 in this manner, and image information on the original P is read by the line sensor 1 during the convey operation. When the trailing end portion of the original P passes the original end portion detection sensor 83, the original end portion detection sensor 83 supplies a detection signal to the line sensor 1 and the external drive force source as a stop preparation signal to stop the operation. In the original image reading device of this embodiment, the original end portion detection sensor 83 is arranged near the reading portion of the line sensor 1, and the feed side of the original P of the platen roller 2, thereby controlling image information reading timings, and convey timings of the original P. The device as shown in FIGS. 25 and 26 is mountable on the apparatus main body as shown in FIGS. 12, 13, 14 and 16.

In the embodiments as above described, a motor as a drive source is provided on the main apparatus side. On the contrary, in the twelfth embodiment as will be described below, a drive source is provided integrally on the unit side.

Figure 27:
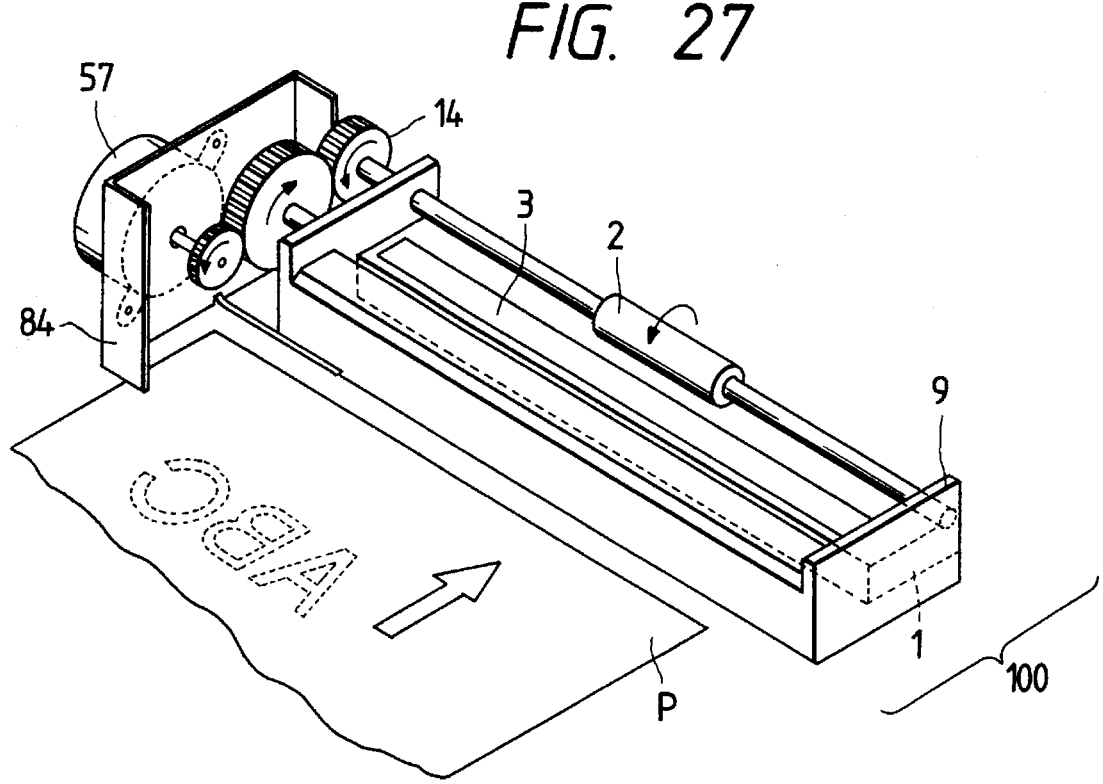
FIG. 27 is a schematic perspective view for explaining an original image reading device according to a twelfth embodiment of the present invention.

That is, in FIG. 27, an original image reading device 100 of this embodiment has a unit structure in which a line sensor 1 as an original reading means for optically reading an image of an original P, a platen roller 2 as an original convey means for conveying the original P, original contact means 3 for bringing the original P to be in tight contact with a reading portion of the line sensor 1, a motor 57 as a drive force generation means for driving the platen roller 2, and gears 14 as drive force transmission means for transmitting a drive force from the motor 57 to the platen roller 2, are integrally locked on a frame. The motor 57 is locked on the frame 9 by a mounting member 84. The mounting member 84 also has a function of radiating heat generated from the motor 57. Note that a spring, not shown, may be arranged below the line sensor 1 to urge the line sensor 1 against the platen roller 2. This device is mountable on the apparatus main body as shown in FIG. 16.

As a result, according to the present invention, it is possible to solve the conventional subjects as previously described. More specifically, (1) As itemized in the following, the assembling position precision and parts precision can be improved.

① The original image reading device has a structure in which the original reading means, the original convey means, the original contact means, the drive force generation means and the drive force transmission means are integrally locked on the frame, and is independently detachable from the main body frame of the image information processing apparatus. Therefore, the assembling position precision of the original image reading device does not depend on a decrease in rigidity of the main body frame upon realization of the compact, lightweight structure, thus easily assuring the assembling position precision.

② Since the necessary gears are attached to the shafts arranged on the frame, the position precision can be easily assured.

③ Since the assembling position precision, and the parts precision can be assured, the conveyance of original image is improved and a compact, lightweight structure can be realized.

(2) Loads and total cost upon changes in design and function can be reduced.

① The original image reading device has a structure in which the original reading means, the original convey means, the original contact means, the drive force generation means, and the drive force transmission means are integrally locked on the frame, and is independently detachable from the main body frame of the image information processing apparatus. Therefore, the layout in the image information processing apparatus can be desirably made, and the degree of freedom of the design of the image information processing apparatus can be increased.

② When the functions of the image information processing apparatus are to be changed, the original image reading device of this embodiment can be standardized and assembled, thus reducing design and development loads. In addition, since design evaluation and examination terms can be shortened, diversified requirements can be readily met.

(3) Replacement is easy when a defect or malfunction is found.

① Since the original image reading device has a structure in which the original reading means, the original convey means, the original contact means, the drive force generation means and the drive force transmission means, are integrally locked on the frame, the function check test of the original image reading device can be conducted before the device is assembled in the image information processing apparatus. Therefore, a defect of the original image reading device can be found early.

② Even when the original image reading device malfunctions during use of the image information processing apparatus, the original image reading device unit need only be replaced. Thus, a user himself or herself can easily repair the device even if he or she has no special education, technique, and tools.

Figure 28:
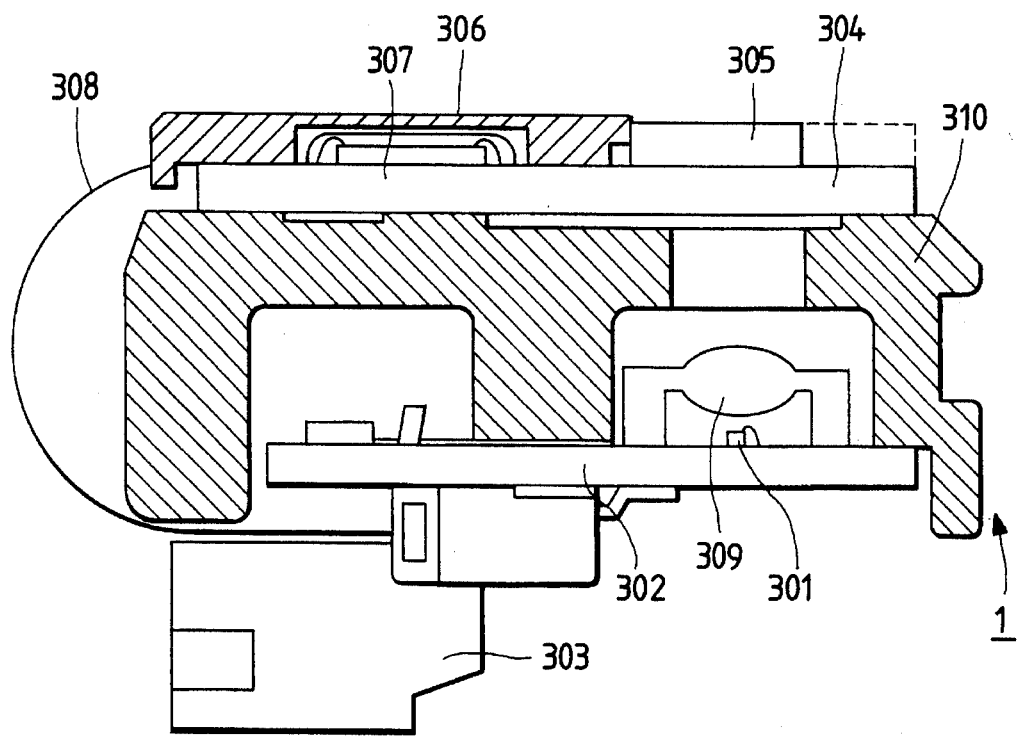
FIG. 28 is a schematic cross-sectional view for explaining a line sensor according to the present invention.

The thirteenth embodiment of the present invention will be described below with reference to FIGS. 28 to 30. First, a preferred embodiment of the line sensor 1 will be described. As shown in FIG. 28, an LED array as a light source is provided on a lower portion of an Al frame body 310. The LED array is constituted of a number of LED chips 301 and a condenser lens 309 provided on a circuit board 302. A mother board 304 is provided on the frame body 310, and a sensor array 305 and a driving IC 307 for the image reading are disposed thereon. 306 is a guide plate also used for a protective cover. The sensor array 305 and the IC 307 on the frame body 310 and the LED array underneath it are electrically connected through a flexible cable 308 to an apparatus main body or unit main body via a connector. The LED array is a light source which is quite favorable owing to its compactness, low price and increased light quantity which has been realized in recent years, but in consideration of a larger light quantity and the color image reading, the LED array is not necessarily preferable. For example, a discharge tube such as a fluorescent lamp, and an electric lamp such as a tungsten lamp or halogen lamp may be used.

Figure 29:
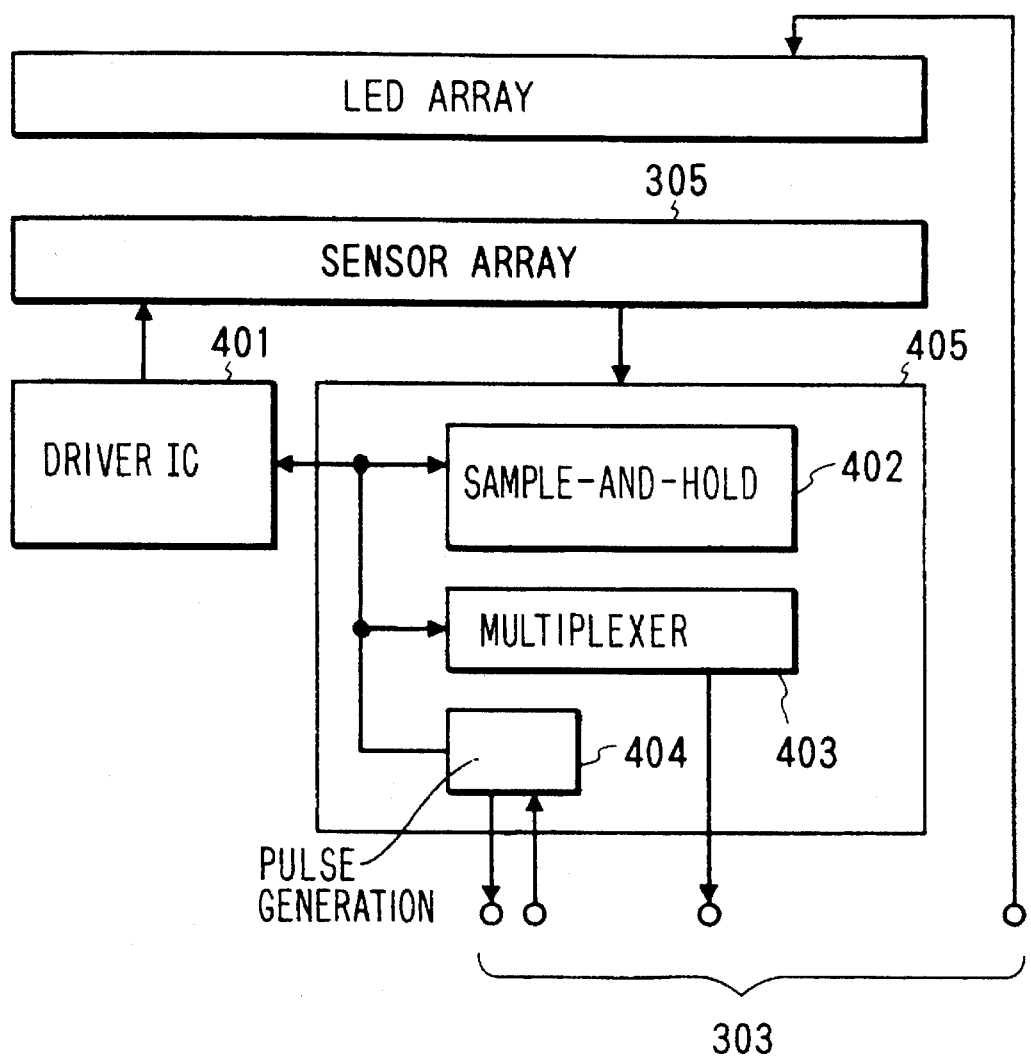
FIG. 29 is a block diagram for showing a drive system of the line sensor according to an embodiment of the present-invention.

FIG. 29 is a block diagram of a drive system in the line sensor 1. The sensor array 305 is driven by a driver IC 401 having a drive circuit including a shift resister. An image signal from the sensor array 305 is held by a sample-and-hold circuit 402 in a signal processing IC 405 having a signal processing circuit, and sequentially selected and output by a multiplexer 403. 404 is a pulse generation circuit for generating clock pulses. They are controlled from the external through connectors 303 including input/output terminals 400 is an LED array.

Figure 30:
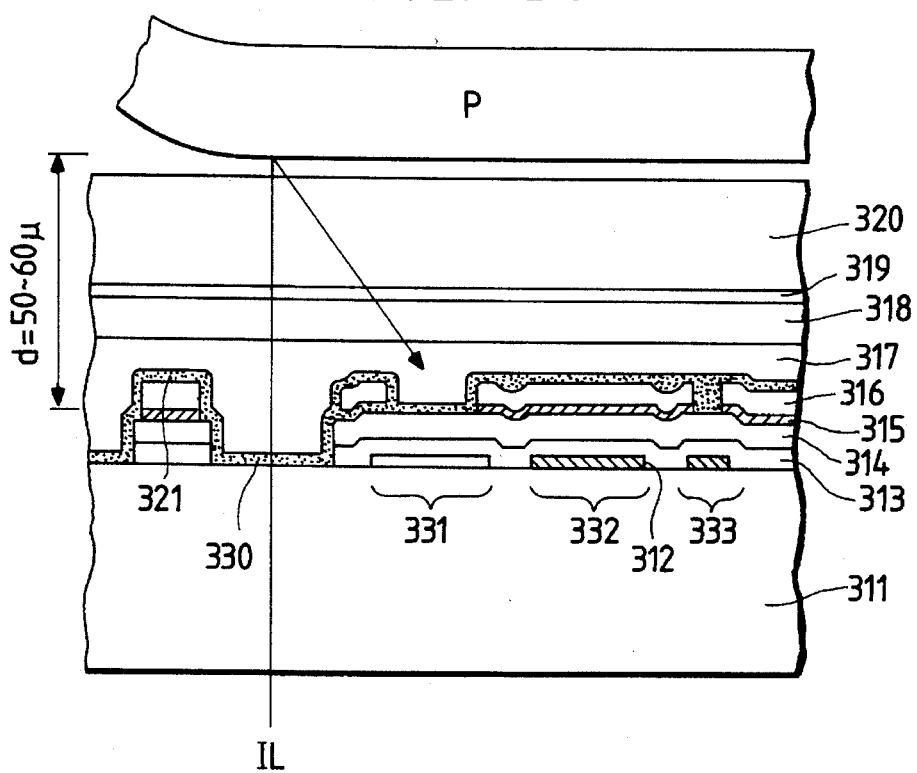
FIG. 30 is a schematic cross-sectional view for showing a sensor array according to an embodiment of the present invention.

FIG. 30 is a schematic sectional view showing the sensor array 305. An electrode 312 is provided on a glass substrate 311, and also used as a light-shielding layer. This electrode is an Al/Cr electrode for a sensor element 331, a storage capacitor 332, and a selective transistor 333, on which there are provided a silicone nitride film 313 as an insulating film, an amorphous silicone 314 as a non single crystal semiconductor film, an $N^+$-type amorphous silicon 315 as an ohmic contact layer, and an Al layer 316 as an upper electrode which are patterned in desired shapes. A protective film composed of a silicone nitride film 321, a polyimide film 317 and an epoxy resin 318 are formed on an element thus formed. On the protective layer, a thin glass plate 320 is provided as an abrasion resistant layer, with the interposition of an ITO layer 319 for preventing the influence of the static electricity.

The light beam IL from the LED array 400 passes through an illumination window 330 to impinge on an original P, and the reflected light is incident upon the sensor element 331, producing photo carriers in the amorphous silicone to change its conductivity. Its variation is stored on the capacitor 332, and selected and output by the transistor 333 composed of a thin film.

Figure 31:
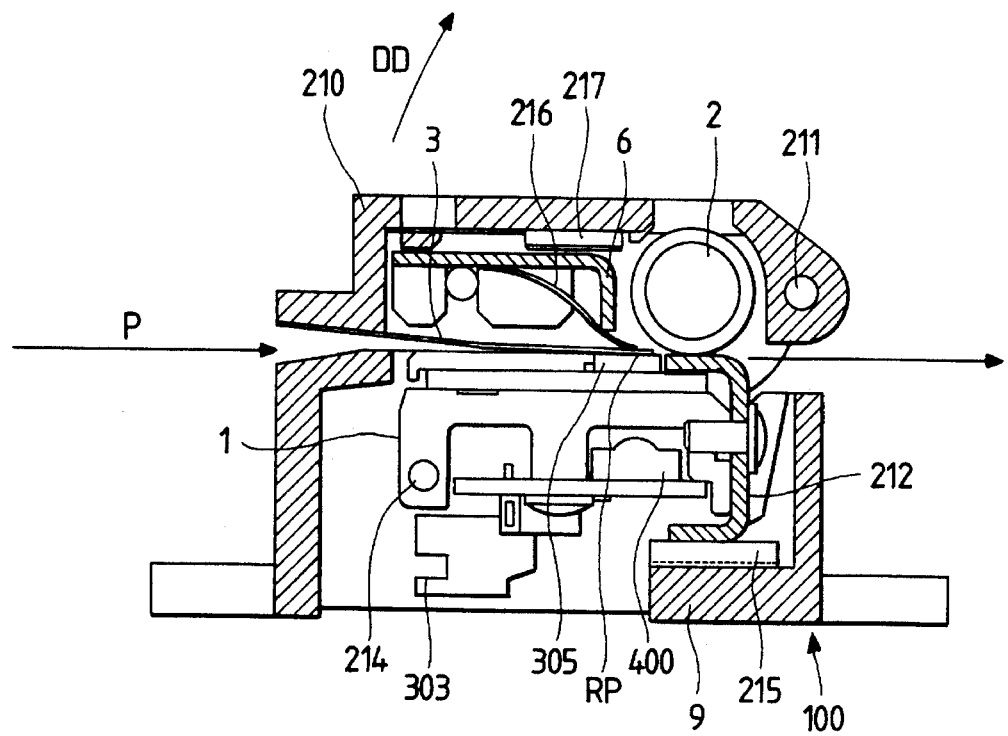
FIGS. 31 and 32 are schematic cross-sectional views for showing an original image reading device according to an embodiment of the present invention.

FIG. 31 is a schematic sectional view showing an original image reading device (unit) according to the thirteenth embodiment. This unit 100 is constituted in such a manner that a lower frame 9 and an upper frame 210 are rotatably supported around a shaft 211. The lower frame 9 has a line sensor 1 as previously described mounted rotatably around a support shaft 214, with a member 212 having a sliding feature screwed at a contact portion of a platen roller 2 into the line sensor 1. A spring 215 provided on the lower frame 9 biases the line sensor 1 via the member 212 around the support shaft 214 in an upward direction to bring it into contact with the platen roller 2 and original contact means 3. 400 is an LED array.

On the other hand, the upper frame 210 has the white film-like, flexible original contact means 3 secured using an adhesive, and pressed against the line sensor 1 by a film-like flexible member 216, a member 6 supporting it, and a leaf spring 217 from the opposite side of an original passing plane. Furthermore, the upper frame 210 has the platen roller 2 rotatably mounted.

As shown in FIG. 31, the roller 2 is in contact with the member 212, and not in contact with a reading position RP of the sensor array 1. At this time, it is desirable that a contact face between the member 212 and the roller 2 is set to have a step difference from +50 μm (high) to −200 μm (low) with respect to the original passing face of the sensor array 305, and more preferably a step difference from 0 to −100 μm, so as to suppress the floating of the original.

At the reading position RP of the sensor array 305, the contact member 3 (white film) is disposed in contact therewith while being pressed from the back side. At this time, the reason for giving a pressure from the back side with the film-like, flexible member 217 is to press uniformly the entire area over the reading length for the sensor array 305 by absorbing surface irregularities of the reading face of the sensor array 305, and to maintain the original in close contact with the line sensor at the reading position RP, without eventual lifting of the original.

The apparatus main body may be constituted in such a manner that either the lower frame 9 or the upper frame 210 is fixed to support the unit 100. However, the former is more desirable because when an original jamming occurs, the original can be removed by rotating the upper frame 210 around the shaft 211 in a direction of an arrow DD.

Figure 32:
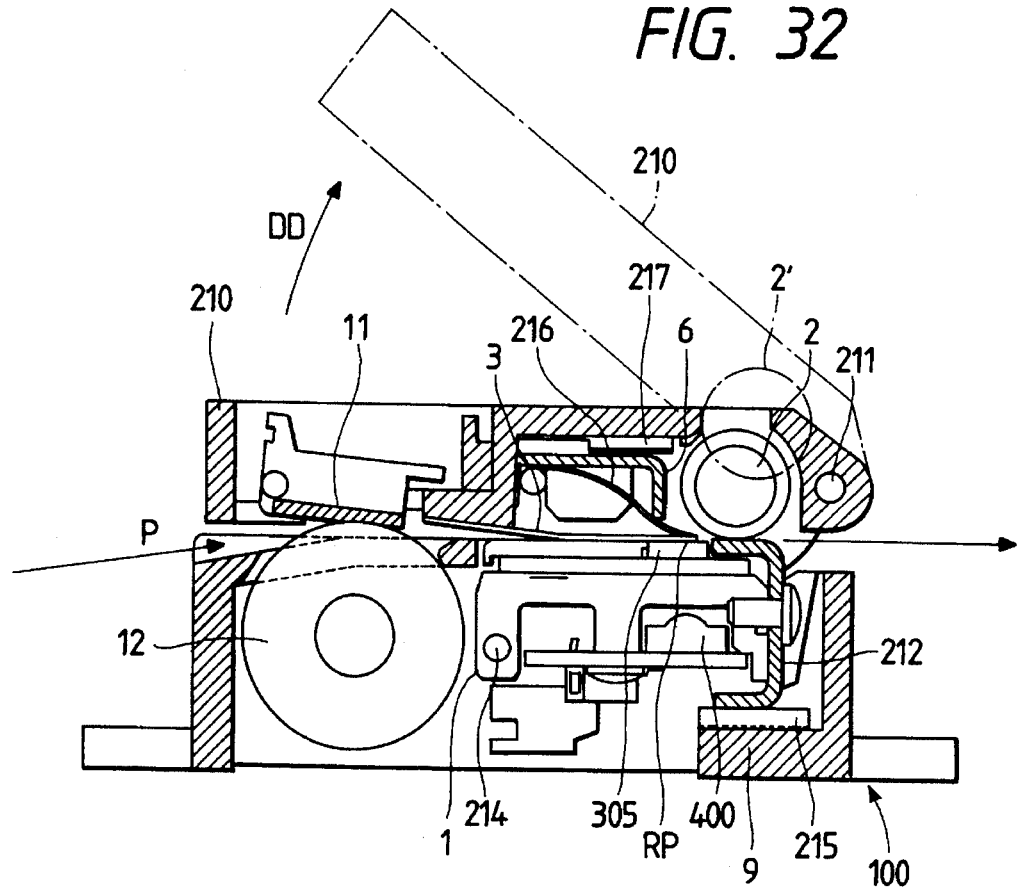
Figure 33A:
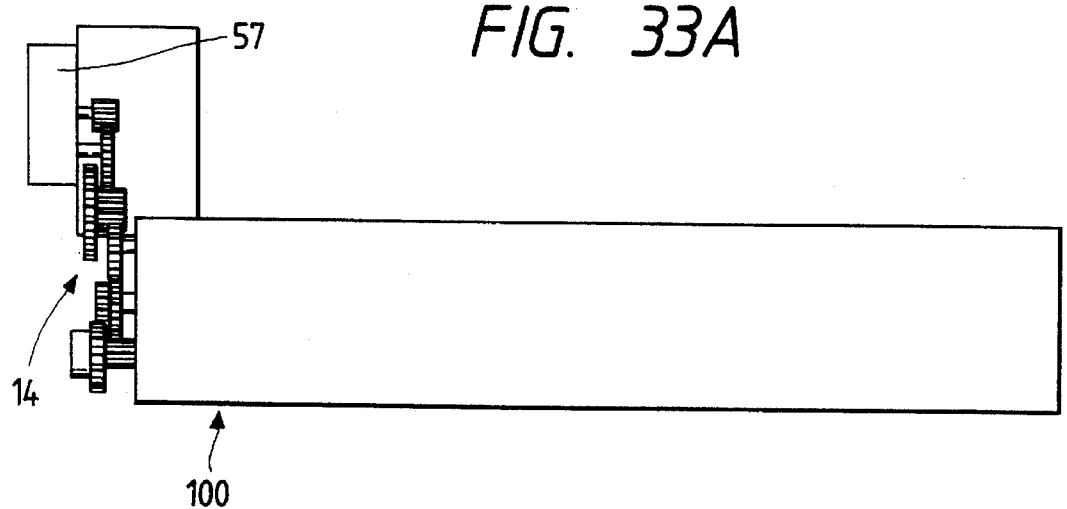
FIGS. 33A and 33B are schematic upper and side views for showing an original image reading device according to an embodiment of the present invention, respectively.
Figure 33B:
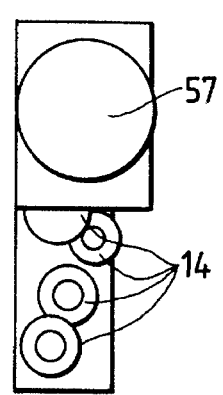

FIGS. 32, 33A and 33B show the fourteenth embodiment of the present invention. This basic constitution is designed in a preferred form by making the constitution as shown in FIG. 31 to correspond to a constitution as shown in FIG. 11. Accordingly, if the upper frame is opened, a friction/separation piece 11 and the contact member 3 (white film) are also separated away from the lower frame 9, together with the roller 2.

FIG. 33A is a schematic view of the unit according to this embodiment, when viewed from above thereof, and FIG. 33B is a side view. In FIG. 33A, there are disposed gears 14 and a motor 57 on the lateral side of the frame. The gears 14 include a gear for rotating the roller 2 and a gear for rotating an ADF roller 12, shown in FIG. 32. As shown in FIG. 32, when an original jamming occurs, the jammed original can be taken out by separating the upper frame 210 and the lower frame 9 around the rotation shaft 211. In this embodiment, the sheet supplying roller 12 which is a drive portion and the platen roller 2 are separated, up and down, from the original passing face as the boundary, in which the gear of the platen roller 2 rotatably mounted on the upper frame is also separated from the gear provided on the lower frame 9. This is aimed to prevent the roller 2 from rotating, when a paper jamming occurs, otherwise, switches or a detection sensor not shown may be touched with fingers in removing the original, and the roller 2 may be rotated abruptly, aggravating the jamming.

Figure 34:
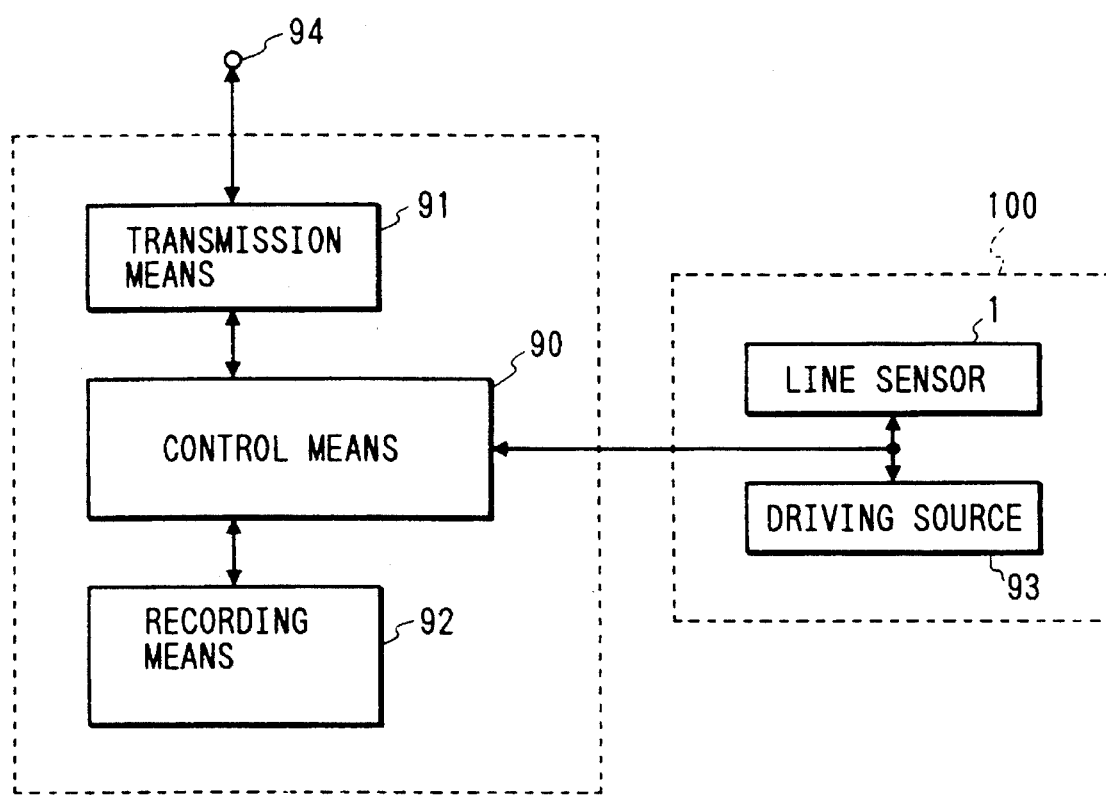
FIG. 34 is a block diagram for showing a control system of the original image reading device according to an embodiment of the present invention.

FIG. 34 is a block diagram, which is like that of the embodiment as shown in FIG. 14. Similar elements in FIG. 34 have the same reference numerals as FIG. 14.

Figure 35A:
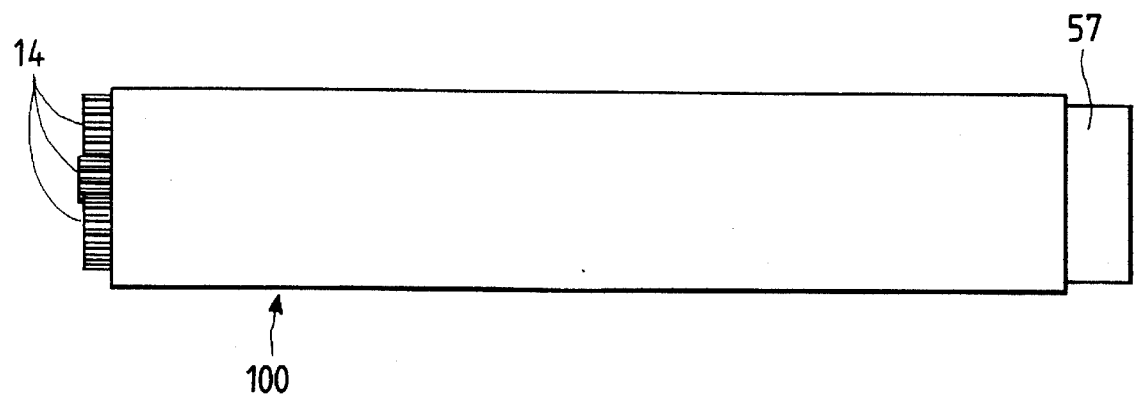
FIGS. 35A and 35B are schematic upper and side views for showing an original image reading device according to an embodiment of the present invention, respectively.
Figure 35B:
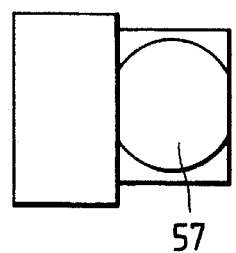

The fifteenth embodiment of the present invention is shown in FIGS. 35A and 35B. While in the previous embodiment (FIGS. 33A and 33B), transmission gears and the motor are disposed on one lateral side of the frame for the unit, some of transmission gears are disposed on the opposite side in this embodiment. And the motor is disposed downward of the reading plane to reduce the occupying plane area.

Figure 36:
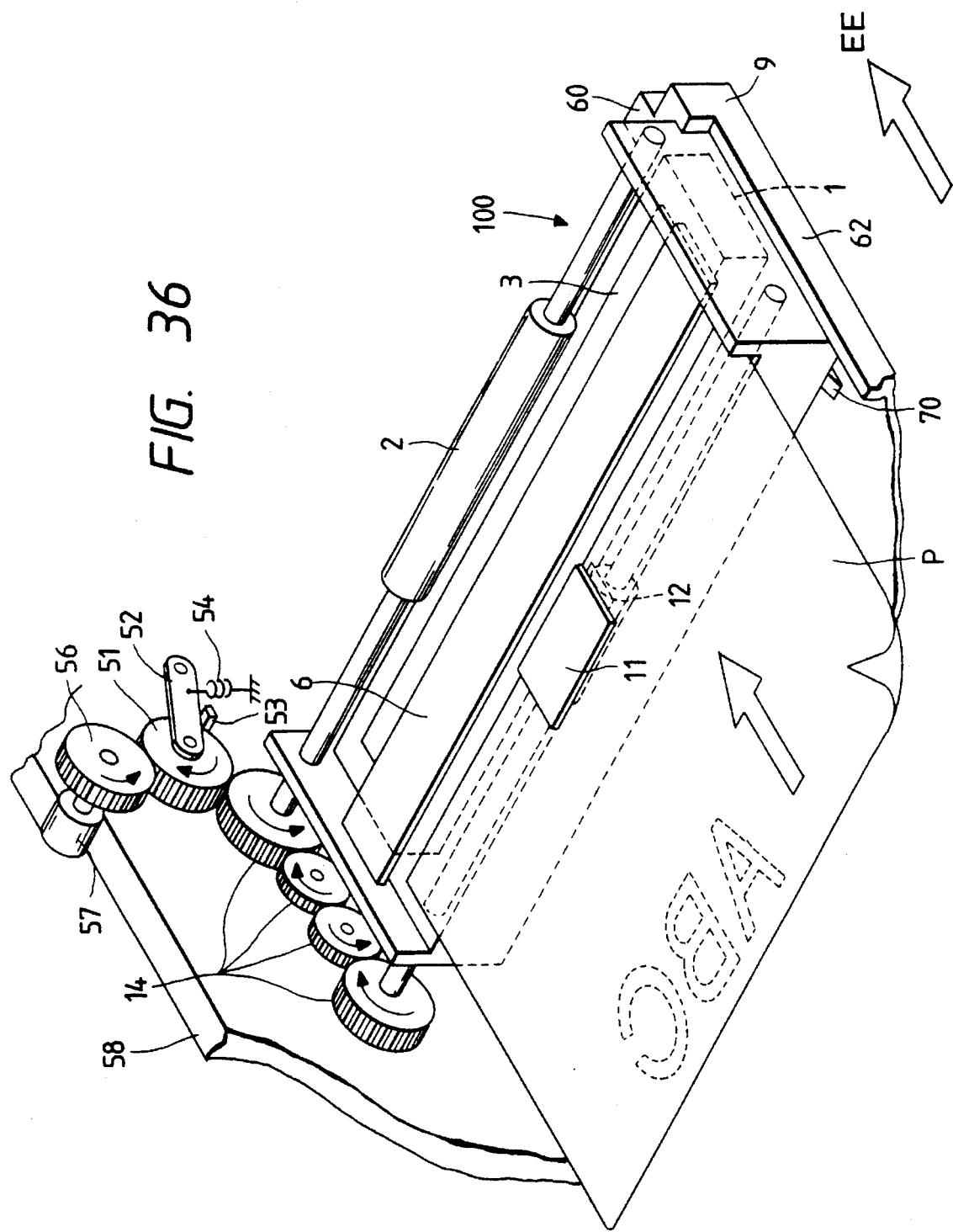
FIG. 36 is a schematic perspective view for showing an original image reading device according to an embodiment of the present invention.

The sixteenth embodiment of the present invention is shown in FIG. 36, representing a state in which an image reading unit 100 according to this embodiment is mounted on the apparatus main body, and the basic constitution is the same as shown in FIGS. 12 and 13. A different point is that the mounting direction of the unit onto the main body is opposite to the conveying direction of the original in the previous example, but they are the same direction EE in this embodiment. Accordingly, when an original jamming occurs, it is easier to detach the unit. Further, the jammed original is less possibly left in the apparatus main body, when the unit is detached, making the jam correction easier.

FIGS. 37A to 40B are schematic sectional views for explaining the image information processing apparatus according to the present invention having a structure in each of the embodiments (as shown in FIGS. 17 to 20), in which a facsimile apparatus having the original image reading device 100 of FIG. 16 is mounted in the main body.

Figure 37A:
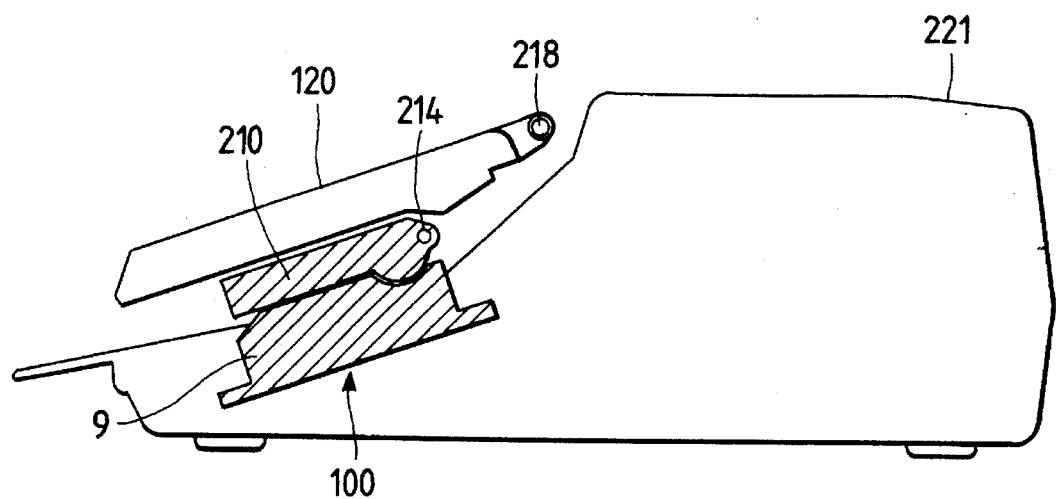
FIGS. 37A and 37B are schematic side views for explaining the opening and closing of an original image reading device according to an embodiment of the present invention, respectively.
Figure 37B:
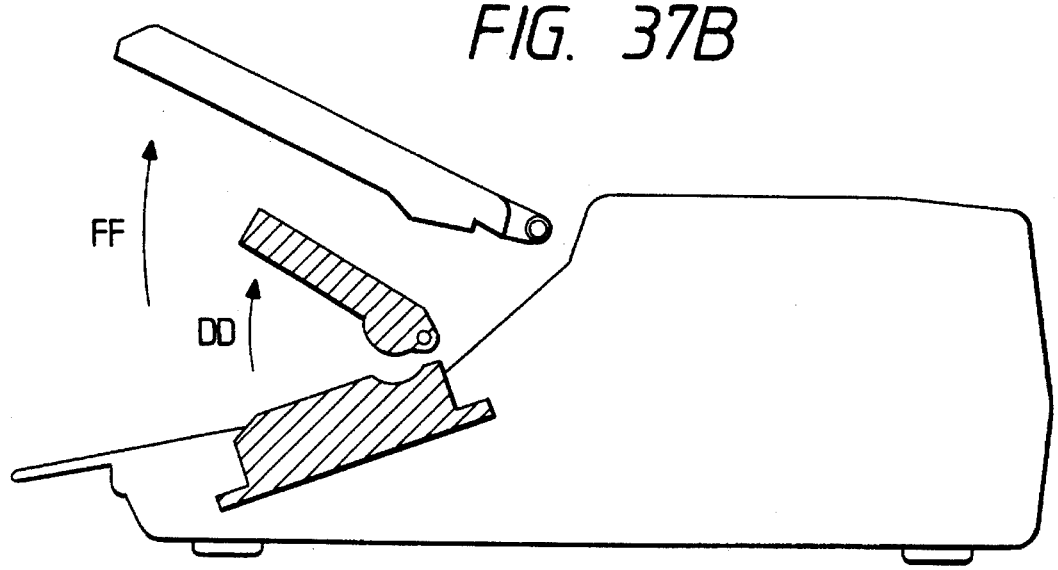

In an embodiment as shown in FIG. 37A, the original image reading device 100 (unit) is disposed in the main body 221, wherein an outer package 120 is rotatable around a fulcrum 218, the unit 100 including an upper frame 210 and a lower frame 9 which are rotatable around the fulcrum 214. As shown in FIG. 37B, when a paper jamming occurs, the jammed original can be removed in such a way as to first open the outer package 120 in a direction of an arrow FF, and then open the upper frame 210 in a direction of an arrow DD. In this embodiment, the lower frame 9 is fixed to a part of the main body 221, and the outer package 120 may be an operation panel having various switches or a display portion, or a simple outer packaging plate.

Figure 38A:
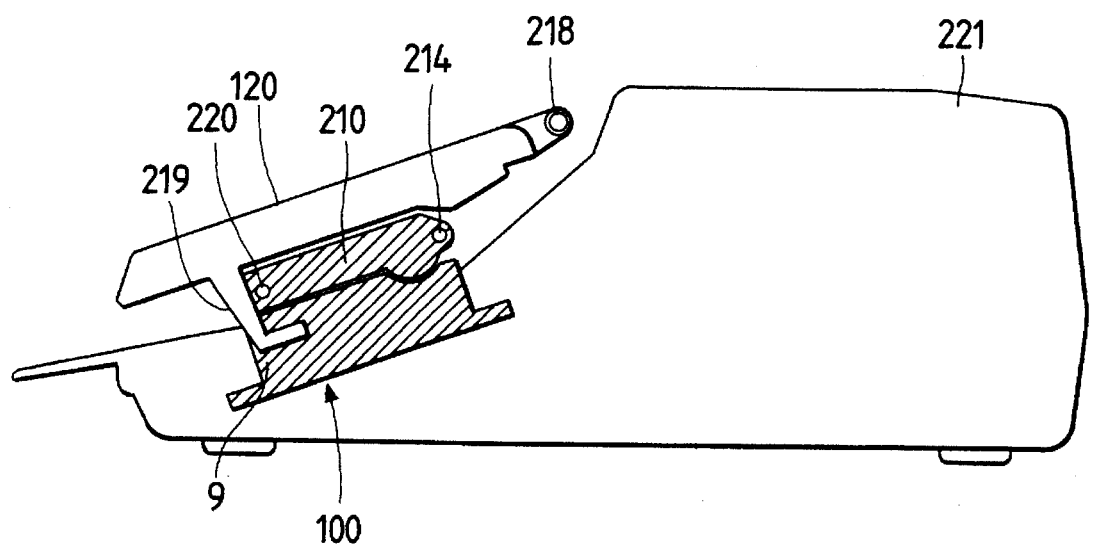
FIGS. 38A and 38B are schematic side views for explaining the opening and closing of another original image reading device according to an embodiment of the present invention, respectively.
Figure 38B:
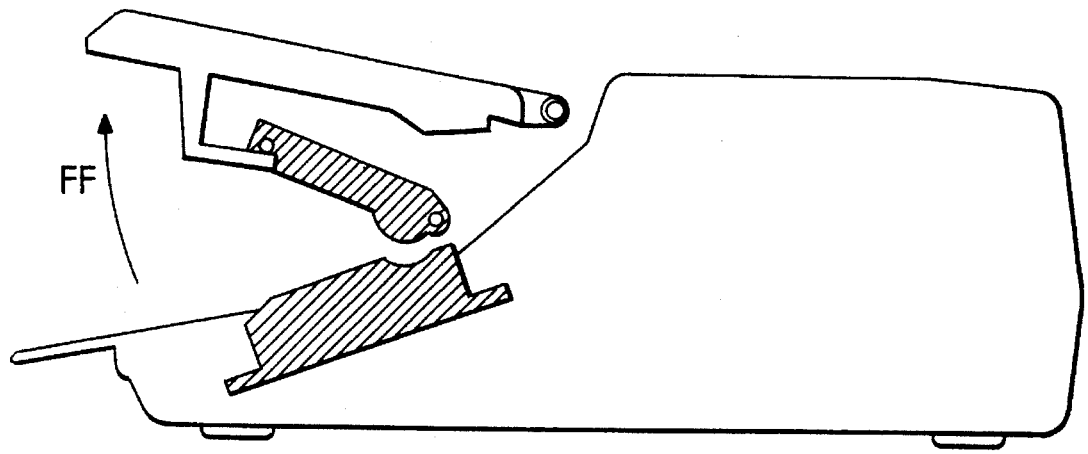

In an embodiment as shown in FIGS. 38A and 38B, the jamming can be released by one opening operation, whereas in the embodiment as shown in FIG. 37, the jamming can be released by two opening operations in the direction FF and the direction DD. That is, as shown in FIG. 38A, the jamming can be released by opening the outer package 120 by means of a claw portion 219 provided on the outer package 120 which is a cover member for the unit 100 and a convex pin portion 220 provided on the upper frame 210, because the upper frame 210 is opened at the same time as shown in FIG. 38B. While an interlock mechanism includes the claw portion 219 and the convex pin portion 220 in this embodiment, it will be appreciated that the claw portion 219 may be engaged in a concave portion provided on the frame or the frame itself.

Figure 39A:
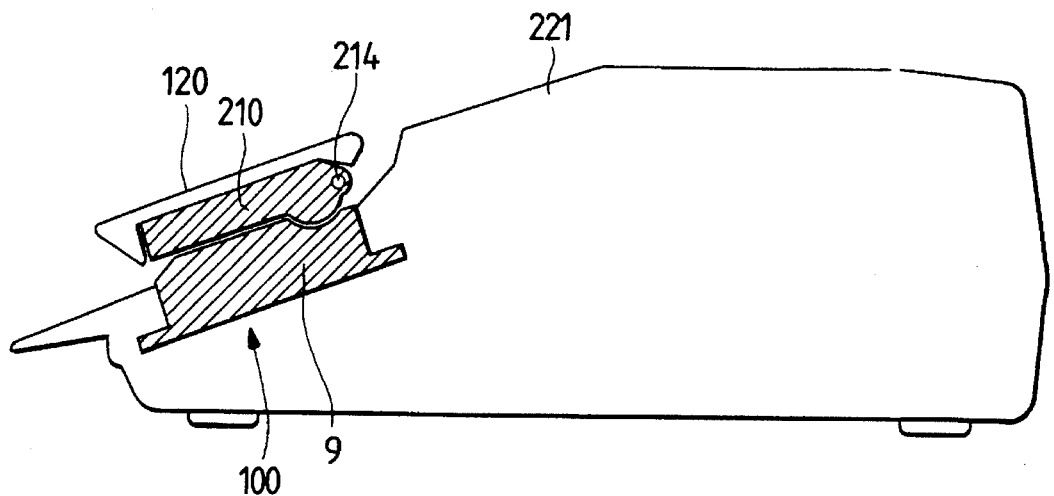
FIGS. 39A and 39B are schematic side views for explaining the opening and closing of still another original image reading device according to an embodiment of the present invention, respectively.
Figure 39B:
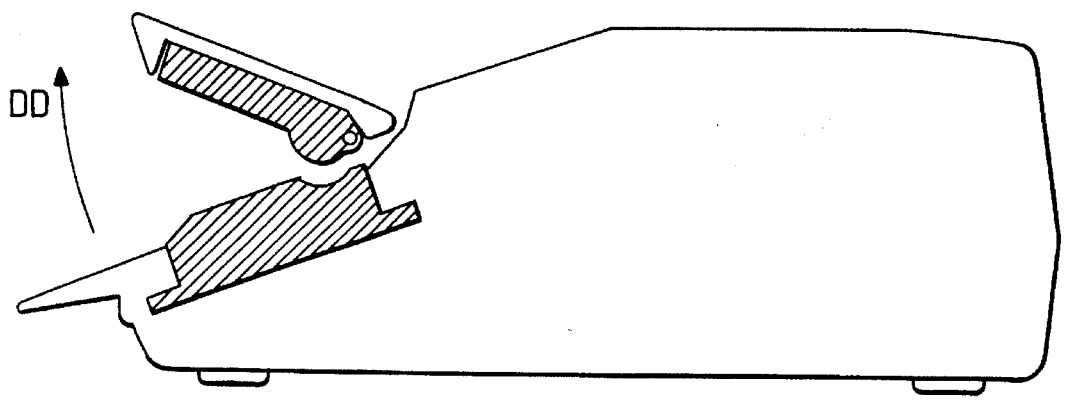

In an embodiment as shown in FIGS. 39A and 39B, the outer package 120 is secured to the upper frame 210 by means of an adhesive or screw as shown in FIG. 39A, and can be opened around the fulcrum 214, together with the upper frame, when releasing the jamming, as shown in FIG. 39B.

Figure 40A:
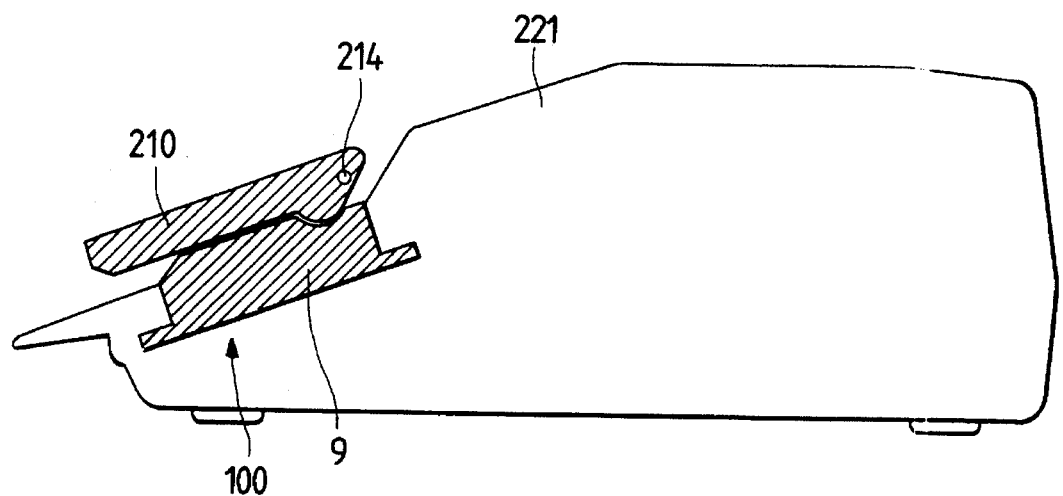
FIGS. 40A and 40B are schematic side views for explaining the opening and closing of another original image reading device according to an embodiment of the present invention, respectively.
Figure 40B:
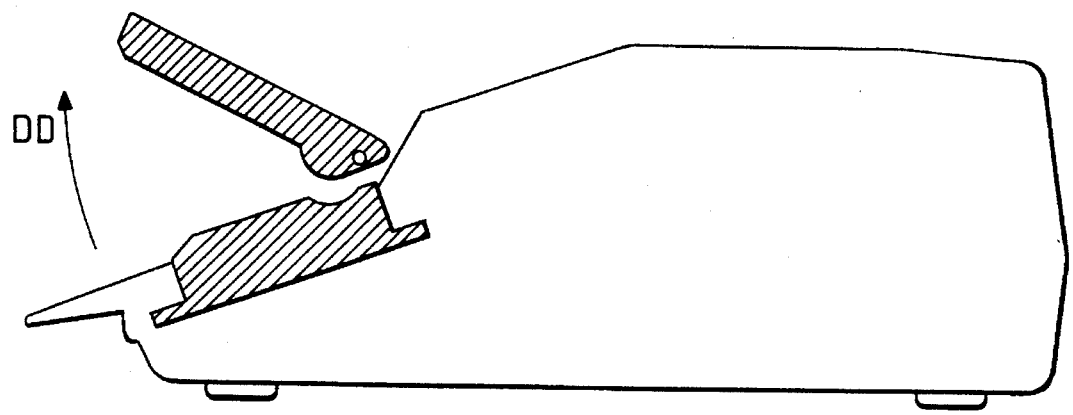

In an embodiment as shown in FIGS. 40A and 40B, the upper frame 210 forms a part of an outer package conforming to the configuration of the main body 221, as shown in FIG. 40A, and can be opened in a direction of an arrow DD, when releasing the jamming, as shown in FIG. 40B.

As will be clear from the embodiments shown in FIGS. 37A to 40B, the present invention can provide an image information processing apparatus that is shorter in height, and that is able to release the jamming easily when it occurs. Further, the present invention can give a great freedom of design and configuration because of its possible variations.

What is claimed is:

1. An original image reading device comprising:

first supporting means comprising an original platen roller, provided on a side of an original opposed to image reading means, for conveying the original at a position on a downstream side from an original reading position, and original contact means for urging the original toward said image reading means, said original contact means being non-cylindrical and provided at the original reading position on the side of the original opposed to said image reading means; and second supporting means including said image reading means, which comprises a contact type reading sensor, for reading image information of the original by receiving a light reflected from the original;

wherein a length of the original platen roller in a direction of a main scanning direction of said image reading means is shorter than a length of said image reading means in the main scanning direction, and said first supporting means and said second supporting means are combined at a fulcrum at an original exit side so as to be relatively rotatable.

2. The original image reading device according to claim 1, wherein said original platen roller is disposed on the original exit side from the original reading position.

3. The original image reading device according to claim 1, wherein said original contact means comprises a resilient member for resiliently pressing the original toward said image reading means.

4. The original image reading device according to claim 1, further comprising an automatic sheet feeding unit.

5. The original image reading device according to claim 4, wherein said automatic sheet feeding unit comprises a sheet supplying roller and a separation piece which is provided at a position corresponding to said sheet supplying roller.

6. The original image reading device according to claim 1, wherein a sheet supplying roller is disposed in said second supporting means.

7. The original image reading device according to claim 4, wherein said automatic sheet feeding unit, a reading portion, and said original platen roller are arranged in order from a sheet supply side to a sheet exhaust side in an original convey direction.

8. The original image reading device according to claim 7, wherein said automatic sheet feeding unit and said original platen roller are arranged such that a straight line connecting (i) a central point on said automatic sheet feeding unit relative to an axial direction of said automatic sheet feeding unit which is orthogonal to an original convey direction of said automatic sheet feeding unit and, (ii) a central point on said original platen roller relative to an axial direction of said original platen roller which is orthogonal to an original convey direction of said original platen roller, passes through a center of an effective reading length for said image reading means in a main scan direction.

9. The original image reading device according to claim 1, wherein at least part of said original contact means comprises a white color.

10. The original image reading device according to claim 1, wherein a slide member having a smaller friction coefficient than a friction coefficient between a reading plane and said original platen roller is disposed at a position adjacent to said original platen roller.

11. The original image reading device according to claim 1, wherein said original image reading device further comprises a drive force transmission means for transmitting a drive force from outside of said original image reading device, to drive said original platen roller.

12. The original image reading device according to claim 1, wherein said original image reading device comprises a drive force source, which is integral with said original image reading device, for generating a drive force to drive said original platen roller.

13. The original image reading device according to claim 11, wherein said drive force transmission means comprises gears.

14. The original image reading device according to claim 11, wherein said drive force transmission means comprises a belt.

15. The original image reading device according to claim 1, further comprising an original illuminating means.

16. The original image reading device according to claim 15, wherein said original illuminating means comprises at least one of an LED, a discharge tube, and a lamp.

17. The original image reading device according to claim 1, wherein said second supporting means further comprises an original illuminating means.

18. The original image reading device according to claim 1, further comprising an electrical terminal for delivering a signal from said image reading means to outside of said original image reading device.

19. The original image reading device apparatus according to claim 1, further comprising a discharging means for discharging the original.

20. The original image reading device apparatus according to claim 1, further comprising an original detection sensor.

21. An original image reading device comprising:

first supporting means comprising an original platen roller, provided on a side of an original opposed to image reading means, for conveying the original at a position on a downstream side from an original reading position, and original contract means for urging the original toward said image reading means, said original contact means being provided at the original reading position on the side of the original opposed to said image reading means; and second supporting means including said image reading means, which comprises a contact type reading sensor, for reading image information of the original by receiving a light reflected from the original, wherein a length of the original platen roller in a direction of a main scanning direction of said image reading means is shorter than a length of said image reading means in the main scanning direction, and said first supporting means and said second supporting means are combined at a fulcrum at an original exit side so as to be relatively rotatable, and wherein said original contact means comprises a film-like flexible member, 22. An original image reading device comprising:

first supporting means comprising an original platen roller, provided on a side of an original opposed to image reading means, for conveying the original at a position on a downstream side from an original reading position, and original contact means for urging the original toward said image reading means, said original contact means being provided at the original reading position on the side of the original opposed to said image reading means; and second supporting means including said image reading means, which comprises a contact type reading sensor, for reading image information of the original by receiving a light reflected from the original, wherein a length of the original platen roller in a direction of a main scanning direction of said image reading means is shorter than a length of said image reading means in the main scanning direction, and said first supporting means and said second supporting means are combined at a fulcrum at an original exit side so as to be relatively rotatable, and wherein said original contact means comprises a first flexible member having a reference color, and a second flexible member for pressing said flexible member against a reading portion.

23. An information processing apparatus comprising:
an original image reading device having:
  i) first supporting means comprising an original platen roller for conveying an original, said original platen roller being provided at a position on a downstream side from an original reading position and original contact means for urging the original toward image reading means, said original contact means being non-cylindrical and provided at the original reading position;
  ii) second supporting means including the image reading means, which comprises a contact type reading sensor, for reading image information of the original by receiving a light reflected from the original,
  wherein a length of the original platen roller in a main scanning direction of said image reading means is shorter than a length of the said reading means in the main scanning direction, and said first supporting means and said second supporting means are combined at a fulcrum so as to be relatively rotatable, said original platen roller being separated from said second supporting means upon relative rotation of said first and second supporting means; and
  iii) a first electrical connecting section for deriving signals from said image reading means;
a signal processing circuit for processing signals from said image reading means;
a second electrical connecting section, coupled to said first electrical connecting section, for supplying signals from said image reading means to said signal processing circuit;
a scanning section; and
an information processing device body,
wherein said original image reading device and said information processing device body are detachably provided.

24. The information processing apparatus according to claim 23, wherein said original platen roller is disposed on an original exit side from the original reading position.

25. The information processing apparatus according to claim 23, wherein said original contact means comprises a film-like flexible member.

26. The information processing apparatus according to claim 23, wherein said original contact means comprises a resilient member for resiliently pressing the original toward said image reading means.

27. The information processing apparatus according to claim 23, wherein said original image reading device further comprises an automatic sheet feeding unit.

28. The information processing apparatus according to claim 27, wherein said automatic sheet feeding unit comprises a sheet supplying roller and a separation piece which is provided at a position corresponding to said sheet supplying roller.

29. The information processing apparatus according to claim 23, wherein a sheet supplying roller is disposed in said second supporting means.

30. The information processing apparatus according to claim 27, wherein said automatic sheet feeding unit, a reading portion, and said original platen roller are arranged in order from a sheet feed side to a sheet exhaust side in an original convey direction.

31. The information processing apparatus according to claim 30, wherein said automatic sheet feeding unit and said original platen roller are arranged such that a straight line connecting (i) a central point on said automatic sheet feeding unit relative to an axial direction of said automatic sheet feeding unit which is orthogonal to an original convey direction of said automatic sheet feeding unit and (ii) a central point on said original platen roller relative to an axial direction of said original platen roller which is orthogonal to an original convey direction of said original platen roller, passes through a center of an effective reading length for said image reading means in a main scan direction.

32. The information processing apparatus according to claim 23, wherein at least part of said original contact means comprises a white color.

33. The information processing apparatus according to claim 23, wherein a slide member having a smaller friction coefficient than a friction coefficient between a reading plane and said original platen roller is disposed at a position adjacent to said original platen roller.

34. The information processing apparatus according to claim 23, wherein said original image reading device further comprises a drive force transmission means for transmitting a drive force from outside of said original image reading device, to drive said original platen roller.

35. The information processing apparatus according to claim 23, wherein said original image reading device comprises a drive force source, which is integral with said original image reading device, for generating a drive force to drive said original platen roller.

36. The information processing apparatus according to claim 23, wherein said original contact means comprises a first flexible member having a reference color, and a second flexible member for pressing said first flexible member against a reading portion.

37. The information processing apparatus according to claim 34, wherein said drive force transmission means comprises gears.

38. The information processing apparatus according to claim 34, wherein said drive force transmission means comprises a belt.

39. The information processing apparatus according to claim 23, further comprising an original illuminating means.

40. The information processing apparatus according to claim 39, wherein said original illuminating means comprises at least one of an LED, a discharge tube, and a lamp.

41. The information processing apparatus according to claim 23, wherein said second supporting means further comprises an original illuminating means.

42. The information processing apparatus according to claim 23, wherein each of said first and second electrical connecting sections comprise one of an electrical terminal and a connector.

43. The information processing apparatus according to claim 23, further comprising a drive source for driving said original platen roller.

44. The information processing apparatus according to claim 23, wherein said information processing device body further comprises a drive source for driving said original platen roller.

45. The information processing apparatus according to claim 23, further comprising a fitting portion in which said original image reading device and said information processing device body are fitted.

46. The information processing apparatus according to claim 23, further comprising a cover member for covering said original image reading device.

47. The information processing apparatus according to claim 46, wherein said cover member comprises an outer package for said information processing apparatus.

48. The information processing apparatus according to claim 46, further comprising an interlock mechanism for opening at least one of a first and second frame of said original image reading device together with an opening of said cover member.

49. The information processing apparatus according to claim 48, wherein said interlock mechanism comprises a hook member which is and an engaging member engaged by said hook member.

50. The information processing apparatus according to claim 49, wherein said engaging member comprises at least one of a pin, a concave portion, and a part of a frame for said original image reading device.

51. The information processing apparatus according to claim 23, wherein said original image reading device further comprises a discharging means for discharging the original.

52. The information processing apparatus according to claim 23, wherein said original image reading device comprises an original detection sensor.

53. An information processing apparatus according to claim 31, wherein a length of the sheet feeding roller of said automatic sheet feeding unit in a main scanning direction of said image reading means is shorter than a length of said image reading means in the main scanning direction.

54. An information processing apparatus according to claim 53, wherein said sheet feeding roller in the main scanning direction of said image reading means is shorter than a width of said original conveying roller.

* * * * *

UNITED STATES PATENT AND TRADEMARK OFFICE
CERTIFICATE OF CORRECTION

PATENT NO. : 5,526,141
DATED : June 11, 1996
INVENTOR(S) : MAKOTO OGURA ET AL.

It is certified that error appears in the above-identified patent and that said Letters Patent is hereby corrected as shown below:

Title page,

<u>AT [57] ABSTRACT</u>

Line 15, "to" should read --to be--.

<u>COLUMN 9</u>

Line 53, "transmission" should read --transmission operation,--.

<u>COLUMN 18</u>

Line 29, "terminals" should read --terminals.--.

<u>COLUMN 22</u>

Line 37, "contract" should read --contact--.
Line 54, "member," should read --member.--.

Signed and Sealed this

Nineteenth Day of November, 1996

Attest:

BRUCE LEHMAN

*Attesting Officer*   *Commissioner of Patents and Trademarks*